(12) United States Patent
Cha et al.

(10) Patent No.: US 11,483,113 B2
(45) Date of Patent: Oct. 25, 2022

(54) METHOD FOR TRANSMITTING AND RECEIVING POSITIONING REFERENCE SIGNAL AND APPARATUS THEREFOR

(71) Applicant: LG Electronics Inc., Seoul (KR)

(72) Inventors: Hyunsu Cha, Seoul (KR); Sukhyon Yoon, Seoul (KR); Hyunsoo Ko, Seoul (KR); Kijun Kim, Seoul (KR); Youngsub Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/025,217

(22) Filed: Sep. 18, 2020

(65) Prior Publication Data

US 2021/0006372 A1    Jan. 7, 2021

Related U.S. Application Data

(63) Continuation of application No. PCT/KR2019/014789, filed on Nov. 4, 2019.

(30) Foreign Application Priority Data

Nov. 2, 2018 (KR) .................. 10-2018-0133998

(51) Int. Cl.
*H04W 4/00* (2018.01)
*H04L 5/00* (2006.01)
(Continued)

(52) U.S. Cl.
CPC .............. *H04L 5/0048* (2013.01); *H04L 1/08* (2013.01); *H04W 72/048* (2013.01)

(58) Field of Classification Search
CPC ....... H04L 5/0048; H04L 1/08; H04W 72/048
See application file for complete search history.

(56) References Cited

U.S. PATENT DOCUMENTS

2012/0195286 A1* 8/2012 Kim ...................... H04L 5/0048
                                                          370/329
2017/0070873 A1* 3/2017 Pon ........................... G01S 5/10
(Continued)

FOREIGN PATENT DOCUMENTS

KR    1020160057336    5/2016
KR    1020180018243    2/2018
(Continued)

OTHER PUBLICATIONS

MediaTek (R1-1611864, "Discussion on NPRS configuration and RSTD measurement Gap", Nov. 18, 2016) (Year: 2016).*
(Continued)

*Primary Examiner* — Maharishi V Khirodhar
(74) *Attorney, Agent, or Firm* — Fish & Richardson P.C.

(57) ABSTRACT

Disclosed is a method for a terminal for receiving a positioning reference signal (PRS) in a wireless communication system. Particularly, the method includes: receiving first information related to a PRS resource group including a plurality of PRS resources, and second information related to a repetition count for the PRS resource group; and receiving a PRS on the plurality of PRS resources based on the first information and second information, wherein the PRS resource group may be allocated repeatedly as many times as the repetition count within a certain period.

16 Claims, 34 Drawing Sheets

(51) Int. Cl.
  *H04L 1/08* (2006.01)
  *H04W 72/04* (2009.01)

(56) References Cited

U.S. PATENT DOCUMENTS

| | | | | |
|---|---|---|---|---|
| 2018/0097596 | A1* | 4/2018 | Palanivelu | H04L 27/2611 |
| 2018/0139763 | A1* | 5/2018 | Bitra | H04L 5/0064 |
| 2018/0217228 | A1* | 8/2018 | Edge | H04W 64/00 |
| 2018/0270671 | A1* | 9/2018 | Agnihotri | H04W 24/02 |
| 2019/0037525 | A1* | 1/2019 | Liu | H04L 5/0048 |
| 2019/0037529 | A1* | 1/2019 | Edge | H04W 16/28 |
| 2019/0052996 | A1* | 2/2019 | Sahai | H04W 24/10 |
| 2019/0349938 | A1* | 11/2019 | Chen | H04W 72/0453 |
| 2020/0112498 | A1* | 4/2020 | Manolakos | H04L 27/261 |
| 2020/0154239 | A1* | 5/2020 | Yamada | G01S 1/20 |
| 2020/0196272 | A1* | 6/2020 | Xiong | G01S 5/0236 |

FOREIGN PATENT DOCUMENTS

| | | |
|---|---|---|
| WO | WO2018026230 | 2/2018 |
| WO | WO2018029326 | 2/2018 |
| WO | WO2018137198 | 8/2018 |

OTHER PUBLICATIONS

Huawei (R1-1611144, Reno, USA, Nov. 14-18, 2016, Title: Configuration of downlink positioning reference signal for NB-IoT) (Year: 2016).*

CATT, "NR Positioning Reference Signals for OTDOA," R1-1810533, 3GPP TSG RAN WG1 Meeting #94bis, Chengdu, China, dated Oct. 8-12, 2018, 14 pages.

Ericsson, "Outcome of offline email discussion on Potential Techniques for NR positioning," R1-1811993, 3GPP TSG-RAN WG1 #94b, Chengdu, P.R. China, dated Oct. 8-12, 2018, 11 pages.

Ericsson, "PRS configurations for FeMTC," R1-1611103, 3GPP TSG-RAN1 Meeting #87, Reno, Nevada, USA,, dated Nov. 14-18, 2016, 7 pages.

Ericsson, "PRS frequency location determination for FeMTC," R1-1611104, 3GPP TSG-RAN1 Meeting #87, Reno, Nevada, USA, dated Nov. 14-18, 2016, 5 pages.

Huawei, HiSilicon, "Configuration of downlink positioning reference signal for NB-IoT," R1-1611144, 3GPP TSG RAN WG1 Meeting #87, Reno, USA, dated Nov. 14-18, 2016, 7 pages.

Intel Corporation, "Techniques for NR Positioning," R1-1810801, 3GPP TSG RAN WG1 Meeting #94bis, Chengdu, China, dated Oct. 8-12, 2018, 12 pages.

Korean Notice of Allowance in Korean Application No. 10-2019-0139340, dated Oct. 26, 2020, 5 pages (with English translation).

PCT International Search Report in International Application No. PCT/KR2019/014789, dated Mar. 4, 2020, 13 pages (with English translation).

Qualcomm Incorporated, "Considerations on NR Positioning using PRS," R1-1811287, 3GPP TSG-RAN WG1 Meeting #94bis, Chengdu, CN, dated Oct. 8-12, 2018, 10 pages.

Office Action in Japanese Appln. No. 2020-550136, dated Nov. 2, 2021, 12 pages (with English translation).

3GPP, "3rd Generation Partnership Project; Technical Specification Group Radio Access Network; Evolved Universal Terrestrial Radio Access (E-UTRA); LTE Positioning Protocol (LPP) (Release 15)," 3GPP TS 36.355 V15.1.0, Sep. 2018, 217 pages.

EP Extended European Search Report in European Appln. No. 19878360.7, dated Jun. 21, 2021, 13 pages.

MediaTek Inc., "Discussion on NPRS configuration and RSTD measurement gap," R1-1611864, Presented at 3GPP TSG RAN WG 1 Meeting #87, Reno, USA Nov. 18-18, 2016, 4 pages.

* cited by examiner

FIG. 1
(Prior Art)
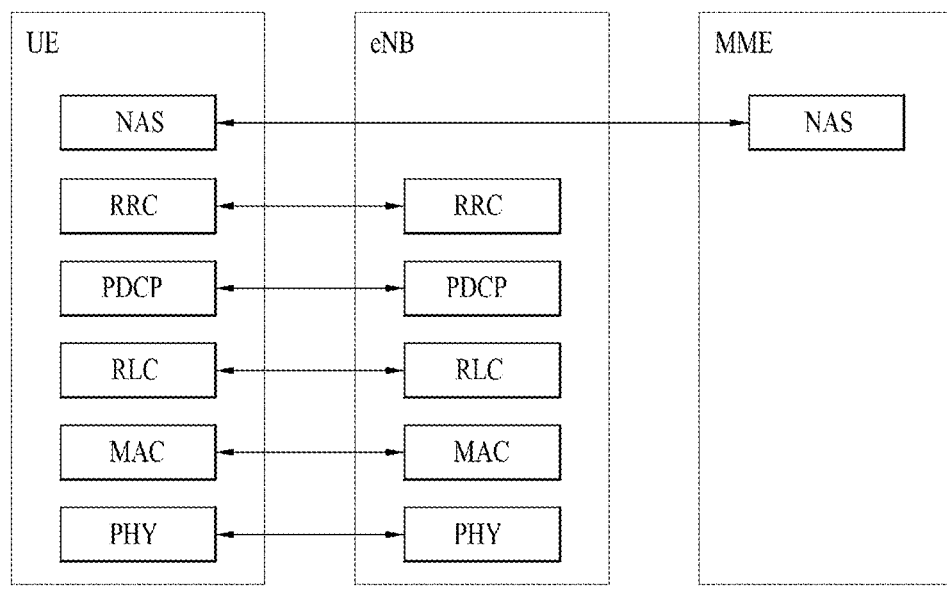
(A) CONTROL-PLANE PROTOCOL STACK
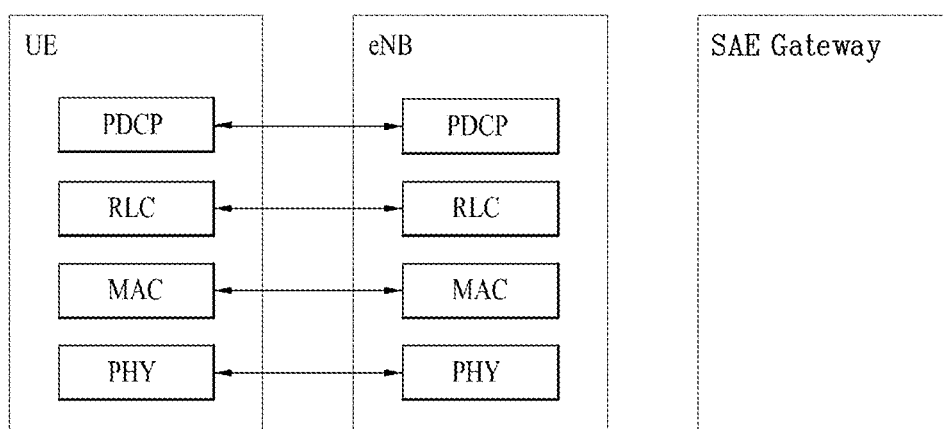
(B) USER-PLANE PROTOCOL STACK

FIG. 9
(Prior Art)
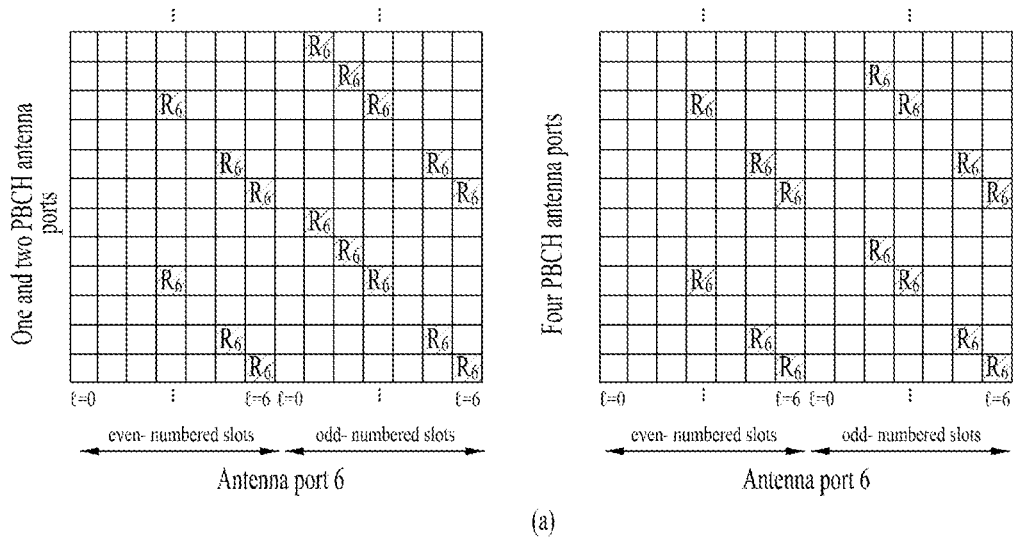
(a)
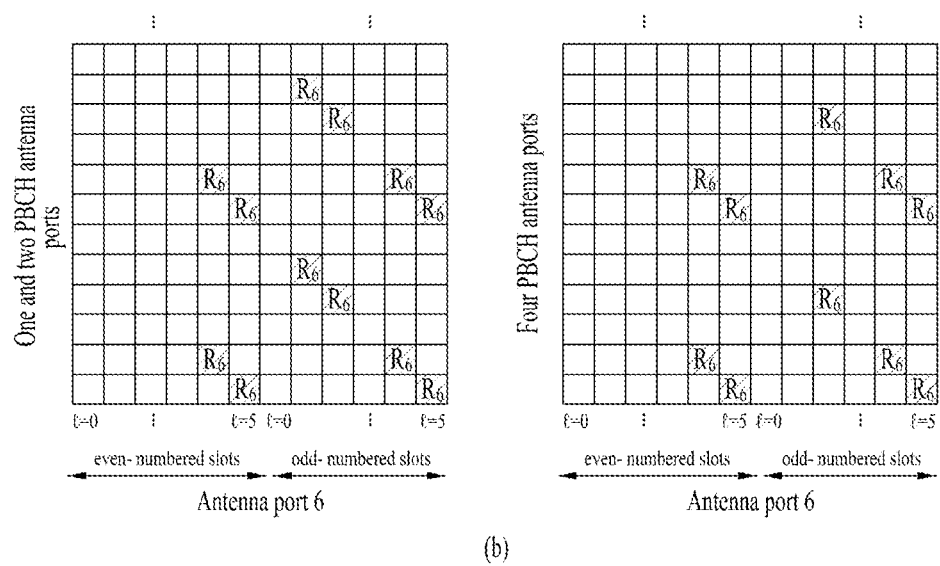
(b)

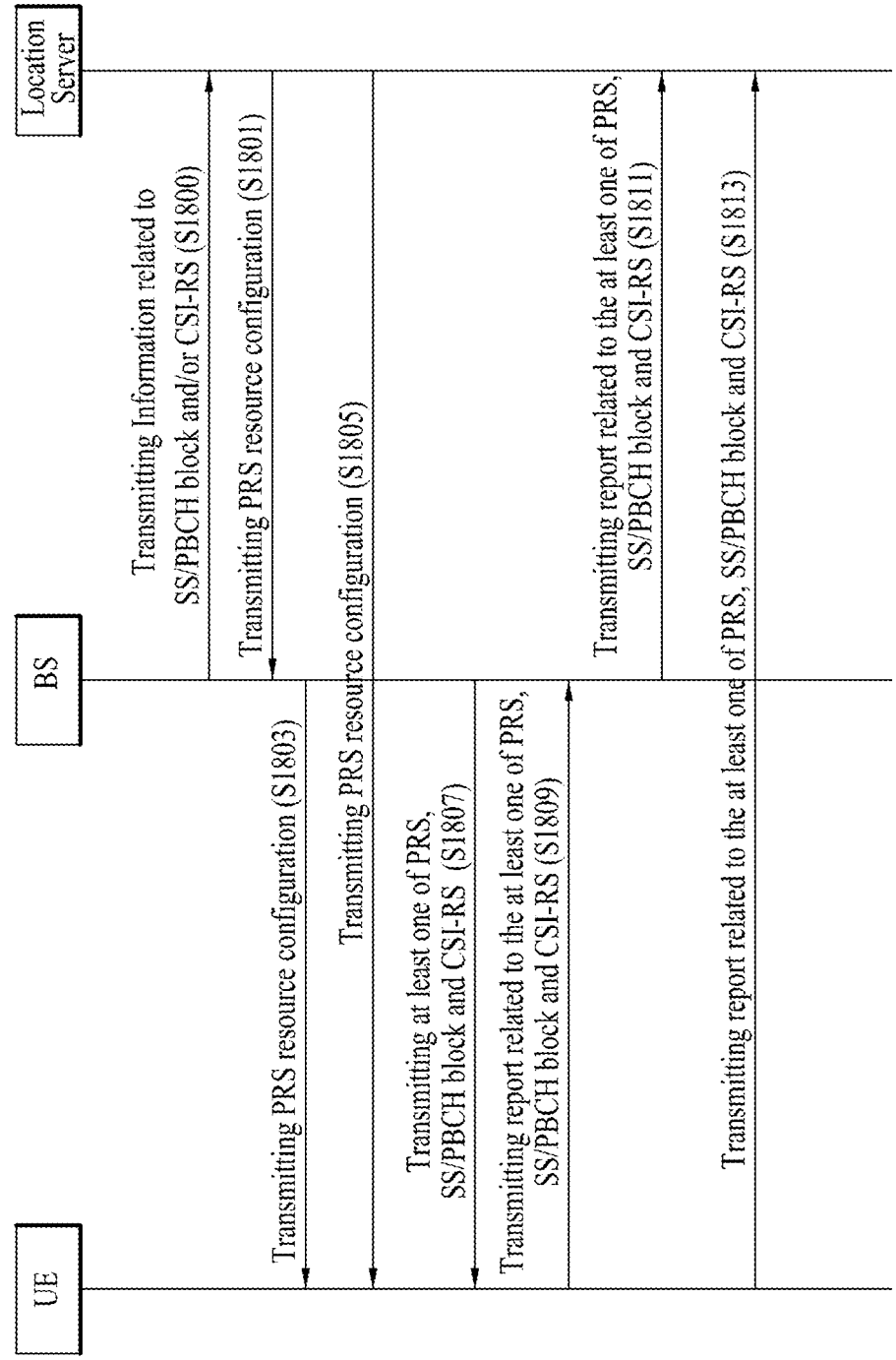

METHOD FOR TRANSMITTING AND RECEIVING POSITIONING REFERENCE SIGNAL AND APPARATUS THEREFOR

CROSS-REFERENCE TO RELATED APPLICATIONS

This application is a continuation of International Application No. PCT/KR2019/014789, filed on Nov. 4, 2019, which claims the benefit of Korean Application No. 10-2018-0133998, filed on Nov. 2, 2018. The disclosures of the prior applications are incorporated by reference in their entirety.

TECHNICAL FIELD

The present disclosure relates to a method and apparatus for transmitting and receiving a positioning reference signal (PRS), and more particularly, to a method and apparatus for transmitting and receiving a PRS by repeatedly allocating PRS resources to increase the accuracy of positioning.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An aspect of the present disclosure is to provide a method and apparatus for transmitting and receiving a positioning reference signal (PRS).

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of receiving a positioning reference signal (PRS) by a user equipment (UE) in a wireless communication system includes receiving first information related to a PRS resource group including a plurality of PRS resources and second information related to a repetition number for the PRS resource group, and receiving the PRS in the plurality of PRS resources based on the first information and the second information. The PRS resource group may be allocated repeatedly as many times as the repetition number within a predetermined period.

The predetermined period may be a PRS occasion spanning a length obtained by multiplying a time period for the PRS resource group by the repetition number.

Further, the predetermined period may be equal to or shorter than a transmission periodicity of the PRS.

Further, a maximum number of PRS resources configurable for the UE may be determined based on a capability of the UE.

Further, the method may further include receiving information related a PRS transmission timing offset between a plurality of cells, and the reception of the PRS may include receiving the PRS based on the PRS transmission timing offset.

Further, the method may further include obtaining information related to an angle of a transmission beam for the PRS.

Further, the UE is communicable with at least one of a UE other than the UE, a network, a base station, or an autonomous driving vehicle.

In another aspect of the present disclosure, an apparatus for receiving a PRS in a wireless communication system includes at least one processor, and at least one memory operatively connected to the at least one processor and soring instructions which when executed, cause the at least one processor to perform a specific operation. The specific operation includes receiving first information related to a PRS resource group including a plurality of PRS resources and second information related to a repetition number for the PRS resource group, and receiving the PRS in the plurality of PRS resources based on the first information and the second information. The PRS resource group may be allocated repeatedly as many times as the repetition number within a predetermined period.

The predetermined period may be a PRS occasion spanning a length obtained by multiplying a time period for the PRS resource group by the repetition number.

Further, the predetermined period may be equal to or shorter than a transmission periodicity of the PRS.

Further, a maximum number of PRS resources configurable for the UE may be determined based on a capability of the UE.

Further, the specific operation may further include receiving information related a PRS transmission timing offset between a plurality of cells. The reception of the PRS may include receiving the PRS based on the PRS transmission timing offset.

Further, the specific operation may further include obtaining information related to an angle of a transmission beam for the PRS.

Further, the apparatus is communicable with at least one of a UE, a network, a base station, or an autonomous driving vehicle.

In another aspect of the present disclosure, a UE for receiving a PRS in a wireless communication system includes at least one transceiver, at least one processor, and at least one memory operatively connected to the at least one processor and storing instructions which when executed, cause the at least one processor to perform a specific operation. The specific operation includes receiving first information related to a PRS resource group including a plurality of PRS resources and second information related to a repetition number for the PRS resource group through the at least one transceiver, and receiving the PRS in the plurality of PRS resources based on the first information and the second information through the at least one transceiver.

The PRS resource group may be allocated repeatedly as many times as the repetition number within a predetermined period.

According to the present disclosure, the accuracy of positioning may be increased by repeatedly allocating positioning reference signal (PRS) resources.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 1A and 1B are diagrams illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

FIGS. 9A and 9B illustrate exemplary mapping of a positioning reference signal (PRS) in a long term evolution (LTE) system.

FIGS. 15 to 18 are diagrams illustrating implementation examples of operations of a user equipment (UE), a base station (BS), and a location server according to an embodiment of the present disclosure.

DETAILED DESCRIPTION

Figure 2:
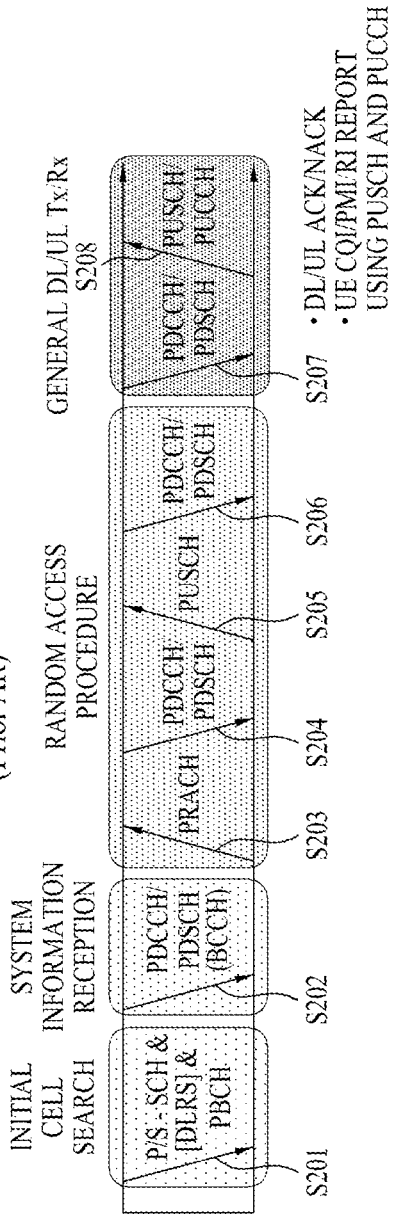
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/ PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/ PDSCH resource/PUCCH resource/PUSCH resource/ PRACH resource. Hereinbelow, if it is said that a UE transmits a PUCCH/PUSCH/PRACH, this means that UCI/ UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/ carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/ TRS port is also used to refer to a pattern of REs occupied by a CRS/UE-RS/CSI-RS/TRS in a predetermined resource area.

Now, 5G communication including an NR system will be described.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional tasks and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both tasks and entertainment. The cloud storage is a special use case which accelerates growth of uplink data transmission rate. 5G is also used for a remote task of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential for smart grid control, industrial automation, robotics, and drone control and adjustment.

Next, a plurality of use cases in the 5G communication system including the NR system will be described in more detail.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

FIGS. 1A and 1B are diagrams illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard. The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

An NR system considers a method using an ultra-high frequency band, i.e., a millimeter frequency band of 6 GHz or above, to transmit data to multiple users using a wide frequency band while maintaining a high transmission rate. In 3GPP, this is used by the name of NR and, in the present disclosure, this will be hereinafter referred to as the NR system.

The NR system uses OFDM or a similar transmission scheme. The NR system may operate based on OFDM parameters different from those used in LTE. Alternatively, the NR system may operate with a legacy LTE/LTE-A numerology, but in a larger system bandwidth (e.g., 100 MHz) than in LTE/LTE-A. Alternatively, one or more cells may support a plurality of numerologies in the NR system. That is, UEs operating with different numerologies may coexist within one cell.

Figure 3:
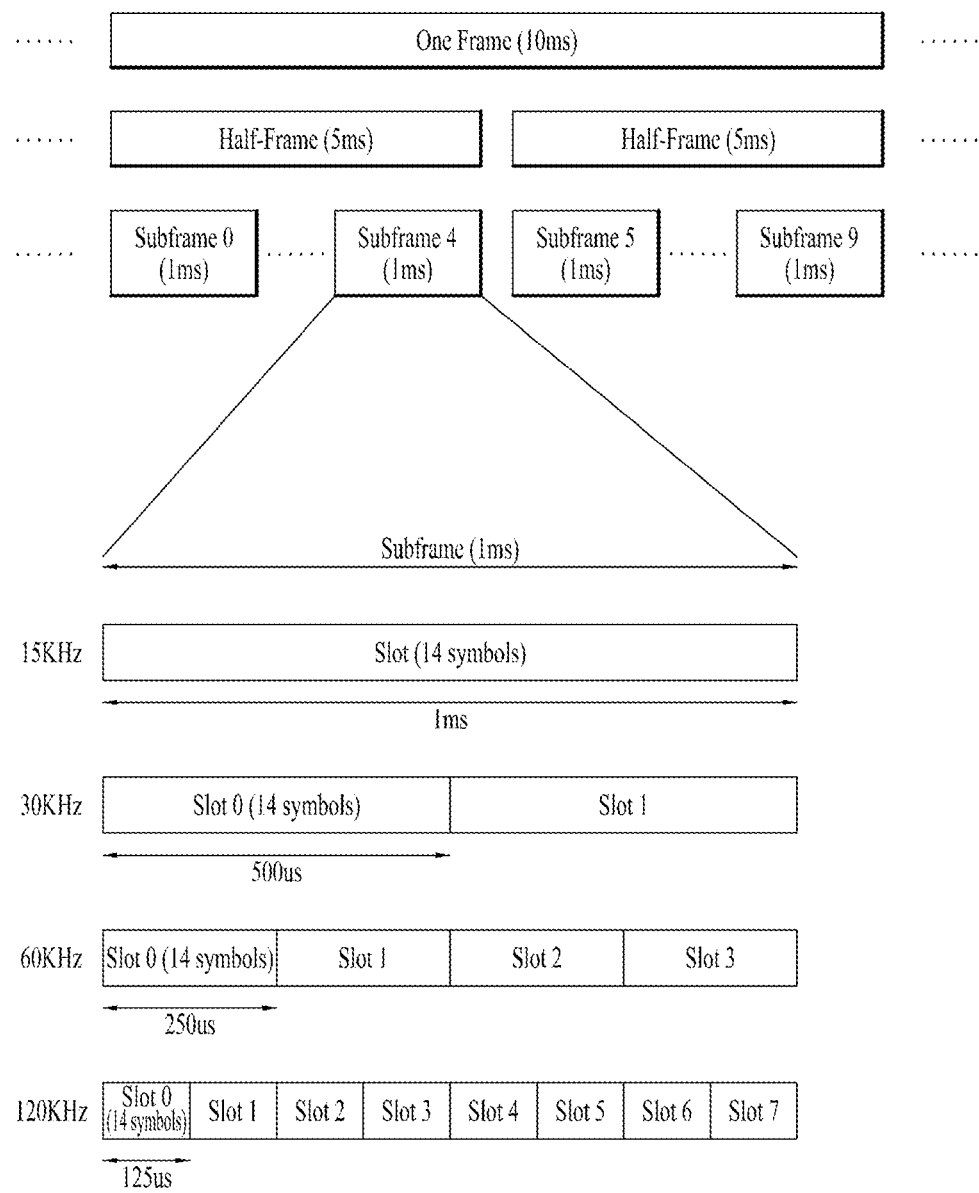
FIGS. 3, 4 and 5 are diagrams illustrating structures of a radio frame and slots in a new radio access technology (NR) system.

FIG. 3 illustrates a structure of a radio frame used in NR.

In NR, UL and DL transmissions are configured in frames. The radio frame has a length of 10 ms and is defined as two 5-ms half-frames (HFs). The half-frame is defined as five 1-ms subframes (SFs). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
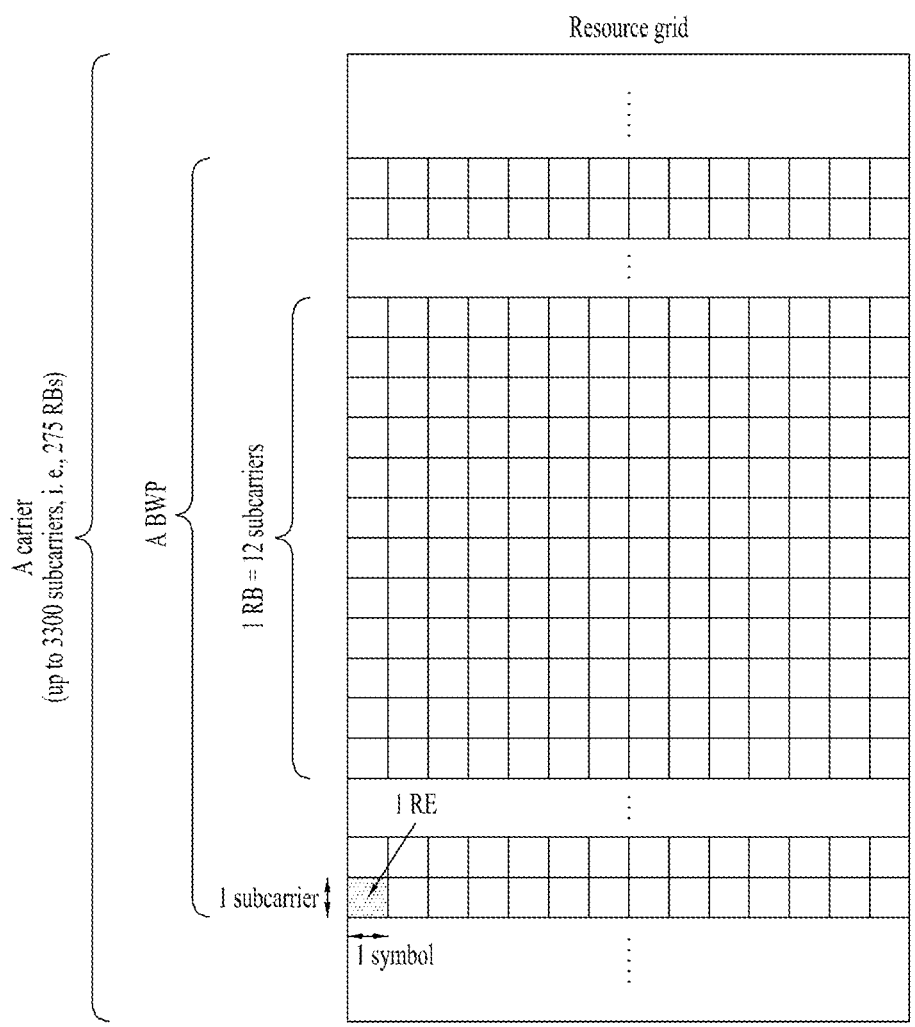

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
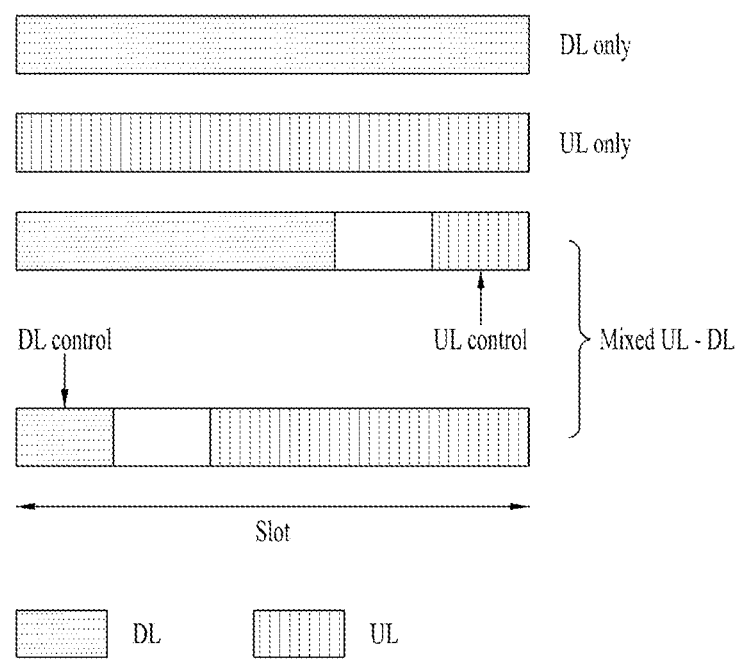

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
1. DL only configuration
2. UL only configuration
3. Mixed UL-DL configuration
DL region+Guard period (GP)+UL control region
DL control region+GP+UL region
DL region: (i) DL data region, (ii) DL control region+DL data region
UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
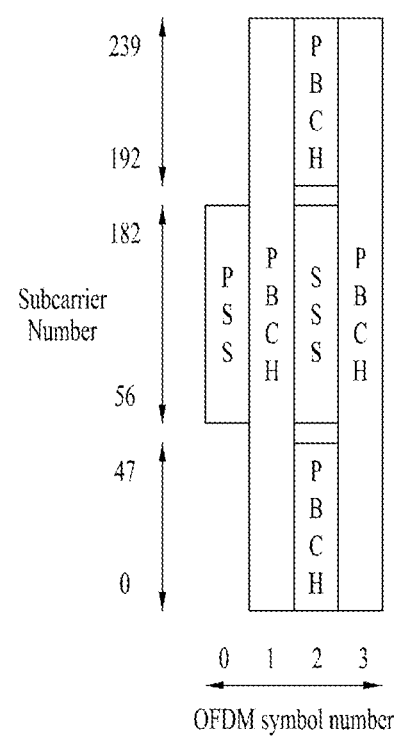
FIGS. 6 and 7 are diagrams illustrating the structure of a synchronization signal block (SSB) and a method of transmitting an SSB.

FIG. 6 illustrates an SSB structure. The UE may perform cell search, system information acquisition, beam alignment for initial access, DL measurement, etc. based on the SSB. The SSB and synchronization signal/physical broadcast channel (SS/PBCH) block are interchangeably used.

Referring to FIG. 6, an SSB includes a PSS, an SSS, and a PBCH. The SSB is configured over four consecutive OFDM symbols, and the PSS, PBCH, SSS/PBCH, and PBCH are transmitted on the respective OFDM symbols. The PSS and SSS may each consist of 1 OFDM symbol and 127 subcarriers, and the PBCH may consist of 3 OFDM symbols and 576 subcarriers. Polar coding and quadrature phase shift keying (QPSK) are applied to the PBCH. The PBCH may have a data RE and a demodulation reference signal (DMRS) RE for each OFDM symbol. There may be three DMRS REs for each RB, and there may be three data REs between DMRS REs.

The cell search refers to a procedure in which the UE acquires time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 3 below.

TABLE 3

| Type of Signals | Operations |
| --- | --- |
| 1$^{st}$ step PSS | * SS/PBCH block (SSB) symbol timing acquisition<br>* Cell ID detection within a cell ID group (3 hypothesis) |
| 2$^{nd}$ Step SSS | * Cell ID group detection (336 hypothesis) |
| 3$^{rd}$ Step PBCH DMRS | * SSB index and Half frame (HF) index (Slot and frame boundary detection) |

TABLE 3-continued

| Type of Signals | Operations |
| --- | --- |
| 4$^{th}$ Step PBCH | * Time information (80 ms, System Frame Number (SFN), SSB index, HF)<br>* Remaining Minimum System Information (RMSI) Control resource set (CORESET)/ Search space configuration |
| 5$^{th}$ Step PDCCH and PDSCH | * Cell access information * RACH configuration |

There may be 336 cell ID groups, and each cell ID group may have three cell IDs. There may be 1008 cell IDs in total. Information about a cell ID group to which a cell ID of a cell belongs may be provided/acquired through the SSS of the cell, and information about the cell ID among 336 cells in the cell ID may be provided/acquired through the PSS.

Figure 7:
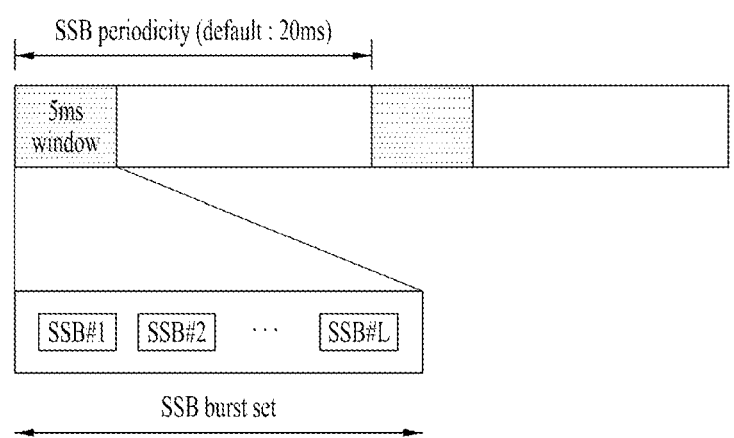

FIG. 7 illustrates SSB transmission. Referring to FIG. 7, the SSB is periodically transmitted in accordance with the SSB periodicity. The basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). A SSB burst set may be configured at the beginning of the SSB periodicity. The SSB burst set may be configured with a 5 ms time window (i.e., half-frame), and the SSB may be repeatedly transmitted up to L times within the SS burst set. The maximum number of transmissions of the SSB, L, may be given according to the frequency band of the carrier wave as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time position of the SSB candidate is indexed from 0 to L−1 in temporal order within the SSB burst set (i.e., half-frame) (SSB index).

Case A—15 kHz SCS: The index of the start symbol of a candidate SSB is given as {2, 8}+14*n. When the carrier frequency is lower than or equal to 3 GHz, n=0, 1. When the carrier frequency is 3 GHz to 6 GHz, n=0, 1, 2, 3.

Case B—30 kHz SCS: The index of the start symbol of a candidate SSB is given as {4, 8, 16, 20}+28*n. When the carrier frequency is lower than or equal to 3 GHz, n=0. When the carrier frequency is 3 GHz to 6 GHz, n=0, 1.

Case C—30 kHz SCS: The index of the start symbol of a candidate SSB is given as {2, 8}+14*n. When the carrier frequency is lower than or equal to 3 GHz, n=0. When the carrier frequency is 3 GHz to 6 GHz, n=0, 1, 2, 3.

Case D—120 kHz SCS: The index of the start symbol of a candidate SSB is given as {4, 8, 16, 20}+28*n. When the carrier frequency is higher than 6 GHz, n=0, 1, 2, 3, 5, 6, 7, 8, 10, 11, 12, 13, 15, 16, 17, 18.

Case E—240 kHz SCS: The index of the start symbol of a candidate SSB is given as {8, 12, 16, 20, 32, 36, 40, 44}+56*n. When the carrier frequency is higher than 6 GHz, n=0, 1, 2, 3, 5, 6, 7, 8.

CSI-Related Behavior

In a new radio (NR) system, a CSI-RS is used for time and/or frequency tracking, CSI computation, RSRP calculation, and mobility. Here, CSI computation is related to CSI acquisition, and RSRP computation is related to beam management (BM).

Figure 8:
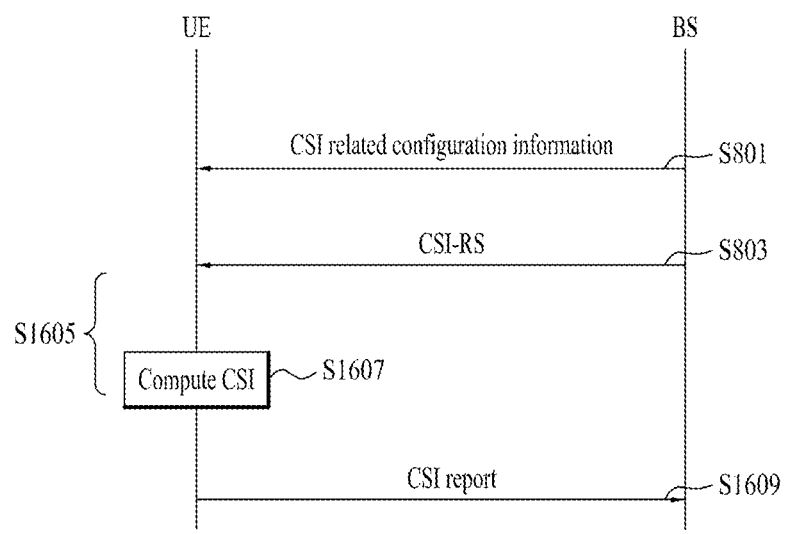
FIG. 8 is a diagram illustrating a channel state information (CSI) reporting process.

FIG. 8 is a flowchart illustrating an exemplary CSI related procedure.

To perform one of the above purposes of the CSI-RS, the UE receives configuration information related to CSI from the BS through RRC signaling (S801).

The CSI related configuration information may include at least one of CSI-interference management (IM) resource related information, CSI measurement configuration related information, CSI resource configuration related information, CSI-RS resource related information, or CSI report configuration related information.

i) The CSI-IM resource related information may include CSI-IM resource information, CSI-IM resource set information, etc. A CSI-IM resource set is identified by a CSI-IM resource set identifier (ID), and one resource set includes at least one CSI-IM resource. Each CSI-IM resource is identified by a CSI-IM resource ID.

ii) The CSI resource configuration related information may be expressed as a CSI-ResourceConfig information element (IE). The CSI resource configuration related information defines a group including at least one of a non-zero power (NZP) CSI-RS resource set, a CSI-IM resource set, or a CSI-SSB resource set. That is, the CSI resource configuration related information includes a CSI-RS resource set list. The CSI-RS resource set list may include at least one of an NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

RRC parameters (e.g., a BM related "repetition" parameter and a tracking related "trs-Info" parameter) indicating usage of a CSI-RS for each NZP CSI-RS resource set may be configured.

iii) The CSI report configuration related information includes a report configuration type parameter (reportConfigType) indicative of a time domain behavior and a report quantity parameter (reportQuantity) indicative of a CSI related quantity to be reported. The time domain behavior may be periodic, aperiodic, or semi-persistent.

The UE measures CSI based on the CSI related configuration information (S803). Measuring the CSI may include (1) receiving a CSI-RS by the UE (S805) and (2) computing the CSI based on the received CSI-RS (S807). For the CSI-RS, RE mapping of CSI-RS resources is configured in time and frequency domains by an RRC parameter CSI-RS-ResourceMapping.

The UE reports the measured CSI to the BS (S809).

1. CSI Measurement

The NR system supports more flexible and dynamic CSI measurement and reporting. The CSI measurement may include receiving a CSI-RS, and acquiring CSI by computing the received CSI-RS.

As time domain behaviors of CSI measurement and reporting, channel measurement (CM) and interference measurement (IM) are supported.

A CSI-IM-based interference measurement resource (IMR) of NR has a design similar to CSI-IM of LTE and is configured independent of ZP CSI-RS resources for PDSCH rate matching.

At each port of a configured NZP CSI-RS-based IMR, the BS transmits an NZP CSI-RS to the UE.

If there is no PMI or RI feedback for a channel, a plurality of resources is configured in a set and the BS or network indicates, through DCI, a subset of NZP CSI-RS resources for CM/IM.

Resource setting and resource setting configuration will be described in more detail.

1.1. Resource Setting

Each CSI resource setting "CSI-ResourceConfig" includes configuration of S($\geq$1) CSI resource sets (which are given by RRC parameter csi-RS-ResourceSetList). A CSI resource setting corresponds to CSI-RS-resourcesetlist. Here, S represents the number of configured CSI-RS resource sets. Configuration of S($\geq$1) CSI resource sets includes each CSI resource set including CSI-RS resources (composed of NZP CSI-RS or CSI-IM), and an SS/PBCH block (SSB) resource used for RSRP computation.

Each CSI resource setting is positioned at a DL bandwidth part (BWP) identified by RRC parameter bwp-id. All CSI resource settings linked to a CSI reporting setting have the same DL BWP.

In a CSI resource setting included in a CSI-ResourceConfig IE, a time domain behavior of a CSI-RS resource may be indicated by RRC parameter resourceType and may be configured to be aperiodic, periodic, or semi-persistent.

One or more CSI resource settings for CM and IM are configured through RRC signaling. A channel measurement resource (CMR) may be an NZP CSI-RS for CSI acquisition, and an interference measurement resource (IMR) may be an NZP CSI-RS for CSI-IM and for IM. Here, CSI-IM (or a ZP CSI-RS for IM) is mainly used for inter-cell interference measurement. An NZP CSI-RS for IM is mainly used for intra-cell interference measurement from multiple users.

The UE may assume that CSI-RS resource(s) for CM and CSI-IM/NZP CSI-RS resource(s) for IM configured for one CSI reporting are "QCL-TypeD" for each resource.

1.2. Resource Setting Configuration

A resource setting may represent a resource set list.

When one resource setting is configured, a resource setting (given by RRC parameter resourcesForChannelMeasurement) is about channel measurement for RSRP computation.

When two resource settings are configured, the first resource setting (given by RRC parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

When one resource setting (given by resourcesForChannelMeasurement) is configured, the resource setting is about channel measurement for RSRP computation.

When two resource settings are configured, the first resource setting (given by resourcesForChannelMeasurement) is for channel measurement, and the second resource setting (given by RRC parameter csi-IM-ResourcesForInterference) is used for interference measurement performed on CSI-IM.

1.3. CSI Computation

If interference measurement is performed on CSI-IM, each CSI-RS resource for channel measurement is associated with a CSI-RS resource in order of CSI-RS resources and CSI-IM resources in a corresponding resource set. The number of CSI-RS resources for channel measurement is the same as the number of CSI-IM resources.

For CSI measurement, the UE assumes the following.

Each NZP CSI-RS port configured for interference measurement corresponds to an interference transmission layer.

Every interference transmission layer of NZP CSI-RS ports for interference measurement considers an energy per resource element (EPRE) ratio.

Different interference signals are assumed on RE(s) of an NZP CSI-RS resource for channel measurement, an NZP CSI-RS resource for interference measurement, or a CSI-IM resource for interference measurement.

2. CSI Reporting

For CSI reporting, time and frequency resources available for the UE are controlled by the BS.

Regarding a CQI, PMI, CSI-RS resource indicator (CRI), SS/PBCH block resource indicator (SSBRI), layer indicator (LI), RI, or L1-RSRP, the UE receives RRC signaling including N(≥1) CSI-ReportConfig reporting settings, M(≥1) CSI-ResourceConfig resource settings, and a list of one or two trigger states (provided by aperiodicTriggerStateList and semiPersistentOnPUSCH-TriggerStateList). In aperiodicTriggerStateList, each trigger state includes a channel and optionally a list of associated CSI-ReportConfigs indicative of resource set IDs for interference. In semiPersistentOnPUSCH-TriggerStateList, each trigger state includes one associated CSI-ReportConfig.

That is, for each CSI-RS resource setting, the UE transmits CSI reporting indicated by CSI-ReportConfigs associated with the CSI-RS resource setting to the BS. For example, the UE may report at least one of the CQI, PMI, CRI, SSBRI, LI, RI, or RSRP as indicated by CSI-ReportConfigs associated with the CSI resource setting. However, if CSI-ReportConfigs associated with the CSI resource setting indicates "none", the UE may skip reporting of the CSI or RSRP associated with the CSI resource setting. The CSI resource setting may include a resource for an SS/PBCH block.

Positioning Reference Signal (PRS) in LTE System

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, 2N_{RB}^{max,DL}-1$$

Equation 1

In Equation 1, $n_s$ denotes a slot number in a radio frame and 1 denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28}\cdot\lfloor N_{ID}^{PRS}/512\rfloor + 2^{10}\cdot(7\cdot(n_s+1)+l+1)\cdot(2\cdot(N_{ID}^{PRS} \bmod 512)+1)+2\cdot(N_{ID}^{PRS} \bmod 512)+N_{CP}$$

Equation 2

Unless additionally configured by higher layers, $N_{ID}^{PRS}$ is equal to $N_{ID}^{cell}$, and $N_{CP}$ is 1 for a normal CP and 0 for an extended CP.

FIGS. 9A and 9B illustrate an exemplary pattern to which a PRS is mapped in a subframe. As illustrated in FIGS. 9A and 9B, the PRS may be transmitted through an antenna port 6. FIG. 9A illustrates mapping of the PRS in the normal CP and FIG. 9B illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 4 below.

TABLE 4

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

UE Positioning Architecture in NR System

Figure 10:
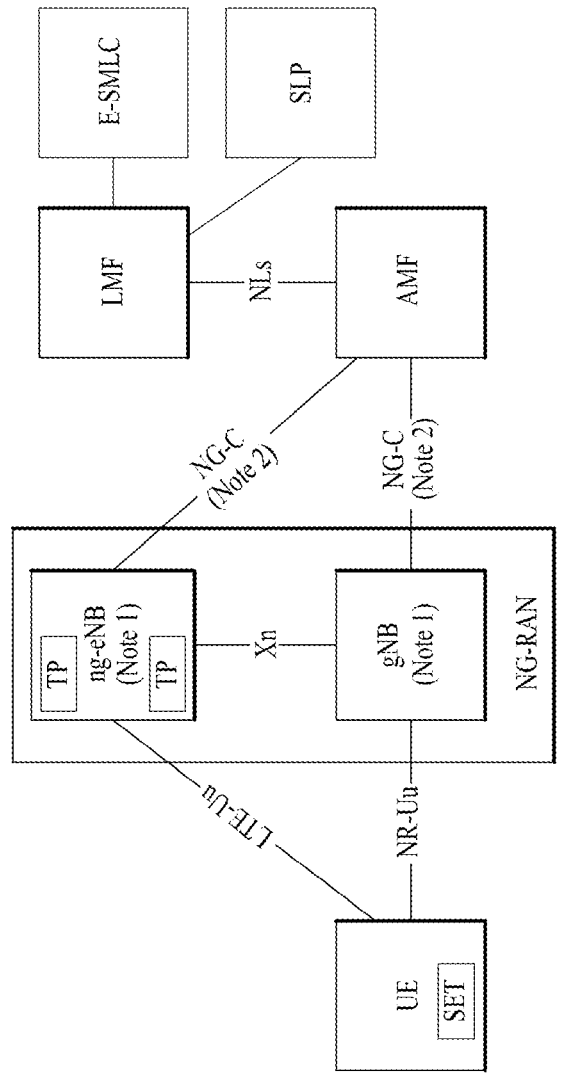
FIGS. 10 and 11 are diagrams illustrating the architecture of a system for positioning a UE and a procedure of positioning a UE.

FIG. 10 illustrates architecture of a 5G system applicable to positioning of a UE connected to an NG-RAN or an E-UTRAN.

Referring to FIG. 10, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 11:
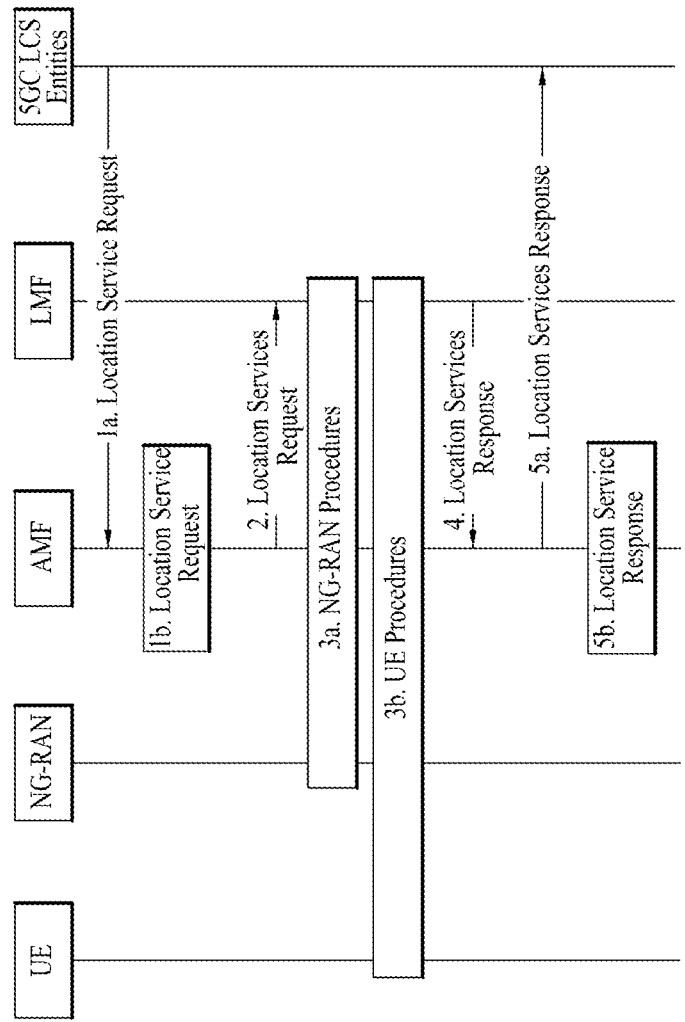

FIG. 11 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 11. In other words, in FIG. 11, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 11. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 10 has been initiated by step 1*a*, the AMF may transfer the location service response to a 5GC entity such as a GMLC. If the procedure of FIG. 10 has been initiated by step 1*b*, the AMF may use the location service response in order to provide a location service related to an emergency call.

Positioning Protocol (1) LTE Positioning Protocol (LPP)

Figure 12:
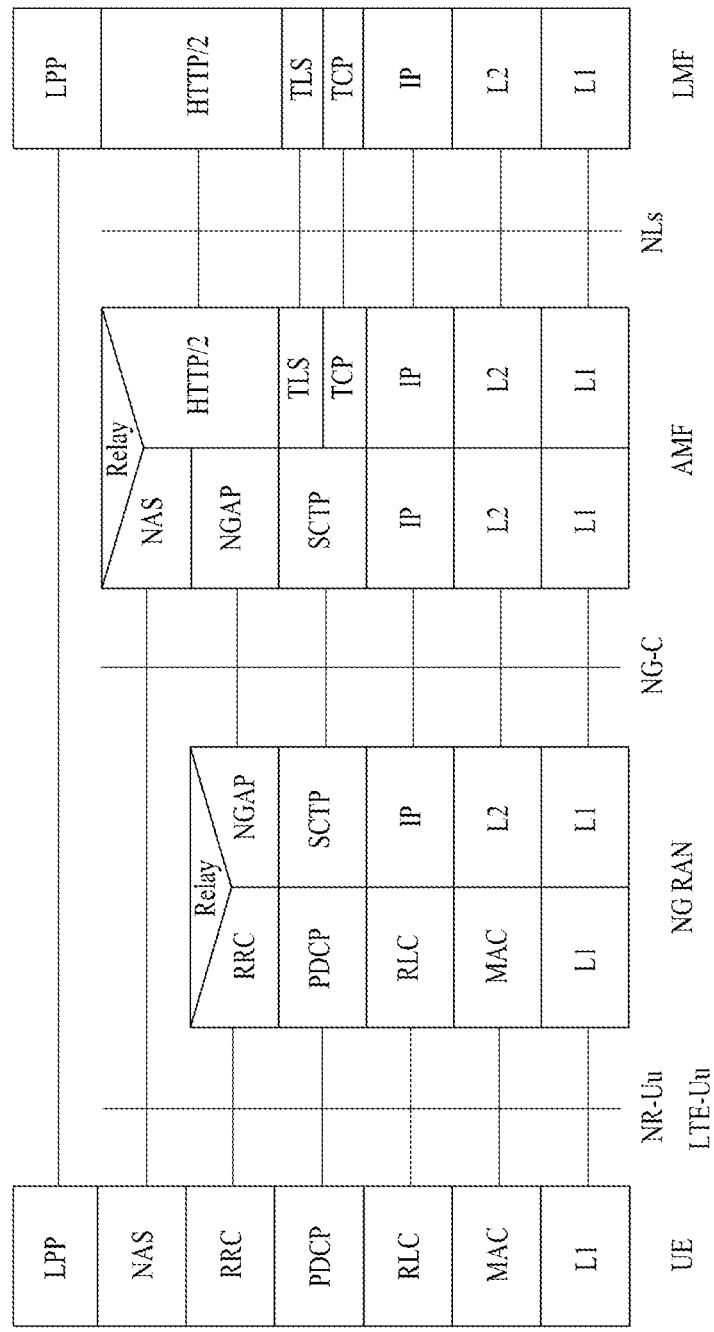
FIG. 12 is a diagram illustrating an exemplary protocol layer stack for supporting transmission of an LTE positioning protocol (LPP) message.

FIG. 12 illustrates an exemplary protocol layer used to support LPP message transfer between an LMF and a UE. An LPP protocol data unit (PDU) may be carried in a NAS PDU between an AMF and the UE. Referring to FIG. 12, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

(2) NR Positioning Protocol a (NRPPa)

Figure 13:
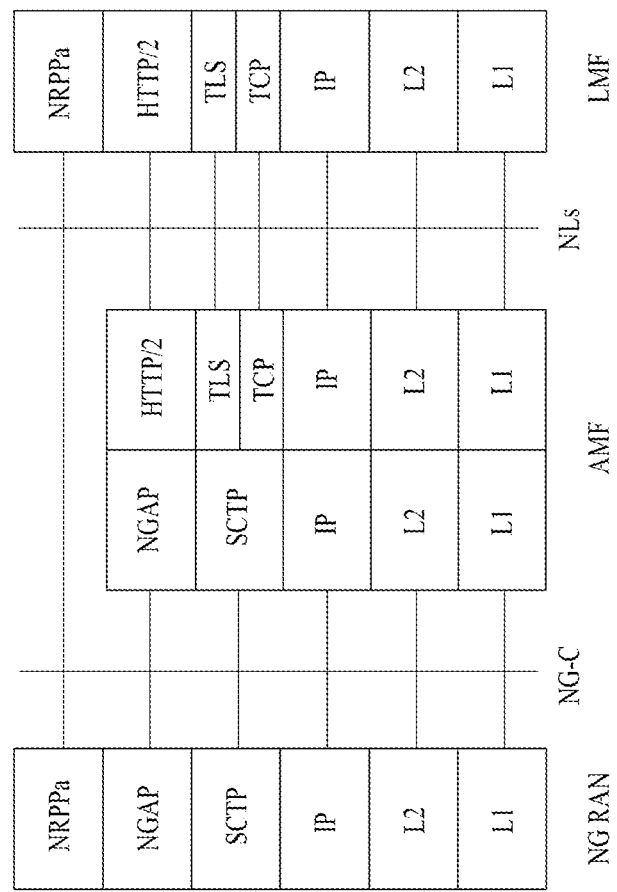
FIG. 13 is a diagram illustrating an exemplary protocol layer stack for supporting transmission of an NR positioning protocol A (NRPPa) protocol data unit (PDU).

FIG. 13 illustrates an exemplary protocol layer used to support NRPPa PDU transfer between an LMF and an NG-RAN node. NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

Positioning Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 14:
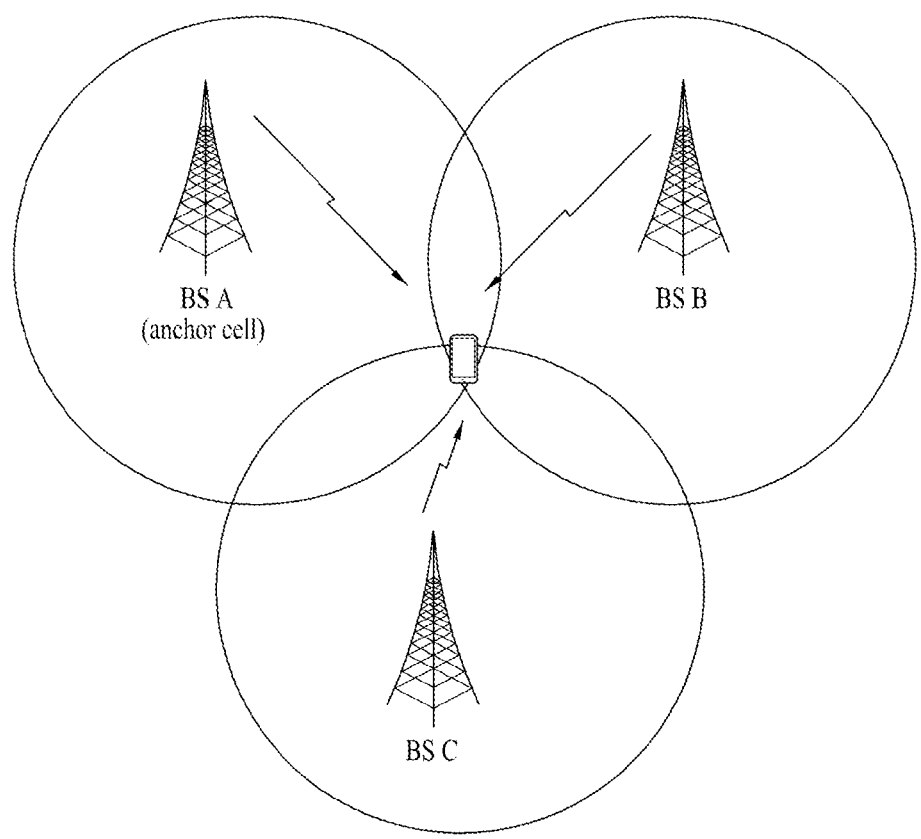
FIG. 14 is a diagram illustrating an embodiment of an observed time difference of arrival (OTDOA) positioning method.

FIG. 14 is a view illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

Equation 3

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

When only one PRS (e.g., PRS ID) is assigned to a specific TP/BS supporting an NR system based on multiple narrow Tx beams, a UE may have difficulty in distinguishing PRSs transmitted on different Tx beams from each other. Further, when different bandwidth configurations are applied to PRSs in spite of the same Tx beam used for the PRSs, the computation complexity of the UE may be reduced. In this context, the following PRS resource and PRS resource set configurations will be described.

FIGS. 15 to 18 are diagrams illustrating implementation examples of operations of a UE, a BS, a location server, and a network according to embodiments of the present disclosure.

Figure 15:
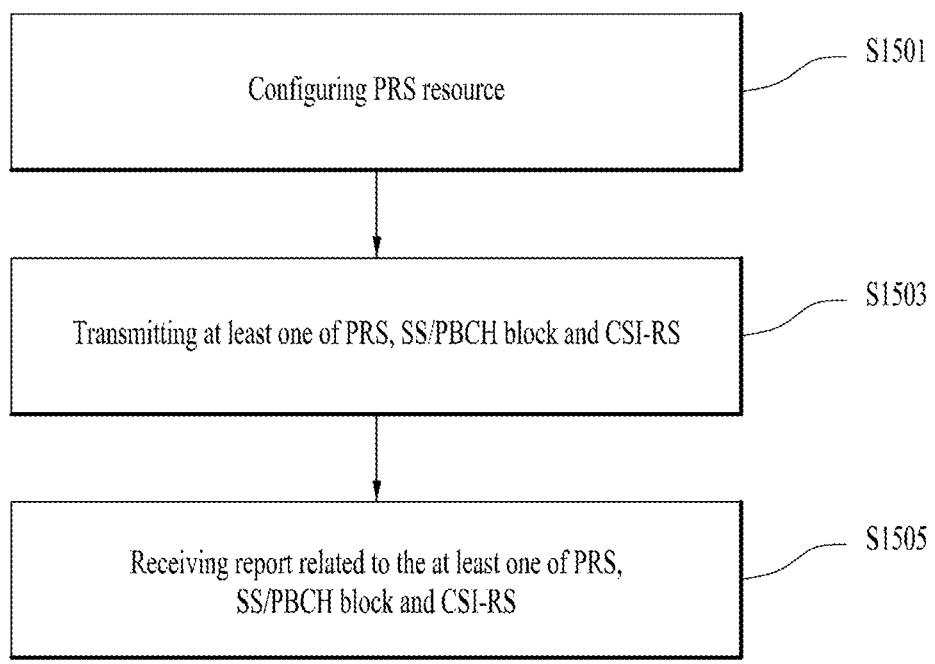

With reference to FIG. 15, a schematic operational implementation example of the BS will be described. Referring to FIG. 15, the BS may configure PRS resources (S1501). The BS may receive information about a PRS resource configuration from the location server and configure the PRS resources based on the information about the PRS resource configuration. A specific method of configuring PRS resources may be based on embodiments which will be described later. The BS may transmit at least one of a PRS, an SS/PBCH block, or a CSI-RS to the UE (S1503). The BS may receive a report related to the at least one of the PRS, the SS/PBCH block, or the CSI-RS (S1505). Specific information included in the report and a specific method of transmitting the report by the UE may be based on embodiments which will be described later. Before step S1501, the BS may transmit, to the location server, information including a notification of using an SS/PBCH block and/or a CSI-RS as PRS resources or for the purpose of determining a Tx/Rx beam for transmitting/receiving PRS resources.

The BS illustrated in FIG. 15 may be one of various wireless devices illustrated in FIGS. 29 to 32. In other words, the operation of the BS illustrated in FIG. 15 may be performed by one of the various wireless devices illustrated in FIGS. 29 to 32.

Figure 16:
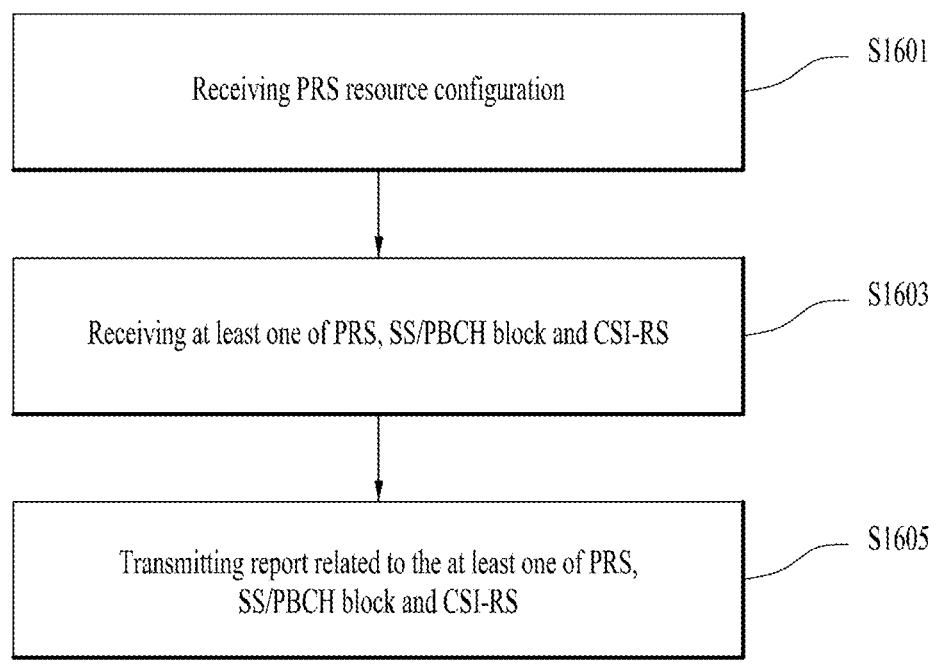

With reference to FIG. 16, a schematic operational implementation example of the UE will be described. Referring to FIG. 16, the UE may receive information related to a PRS resource configuration from the BS or the location server (S1601). Specific embodiments of the information related to a PRS resource configuration will be described later.

The UE may receive at least one of a PRS, an SS/PBCH block, or a CSI-RS from the BS (S1603). The UE may transmit a report related to the at least one of the PRS, the SS/PBCH block, or the CSI-RS (S1605). Specific information included in the report and a specific method of transmitting the report by the UE may be based on the embodiments which will be described later.

The UE illustrated in FIG. 16 may be one of the various wireless devices illustrated in FIGS. 29 to 32. In other words, the operation of the UE illustrated in FIG. 16 may be performed by one of the various wireless devices illustrated in FIGS. 29 to 32.

Figure 17:
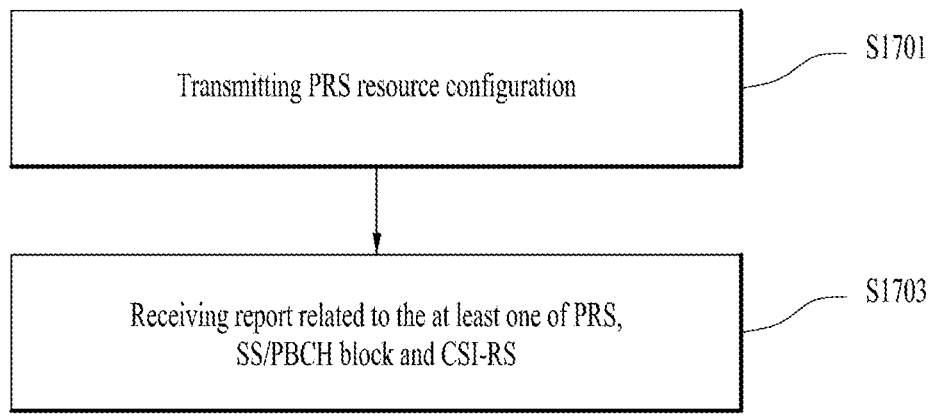

FIG. 17 illustrates a schematic operational implementation example of the location server. Referring to FIG. 17, the location server may transmit PRS resource configuration information to the BS and/or the UE (S1701). A specific method of configuring PRS resources may be based on the embodiments which will be described later. The location server may receive a report related to at least one of a PRS, an SS/PBCH block, or a CSI-RS from the UE or the BS (S1703). Specific information included in the report and a specific method of transmitting the report by the UE or the BS may be based on the embodiments which will be described later. Before step S1701, the location server may receive, from the BS, information including a notification of using an SS/PBCH block and/or a CSI-RS as PRS resources or for the purpose of determining a Tx/Rx beam for transmitting/receiving PRS resources.

Figure 33:
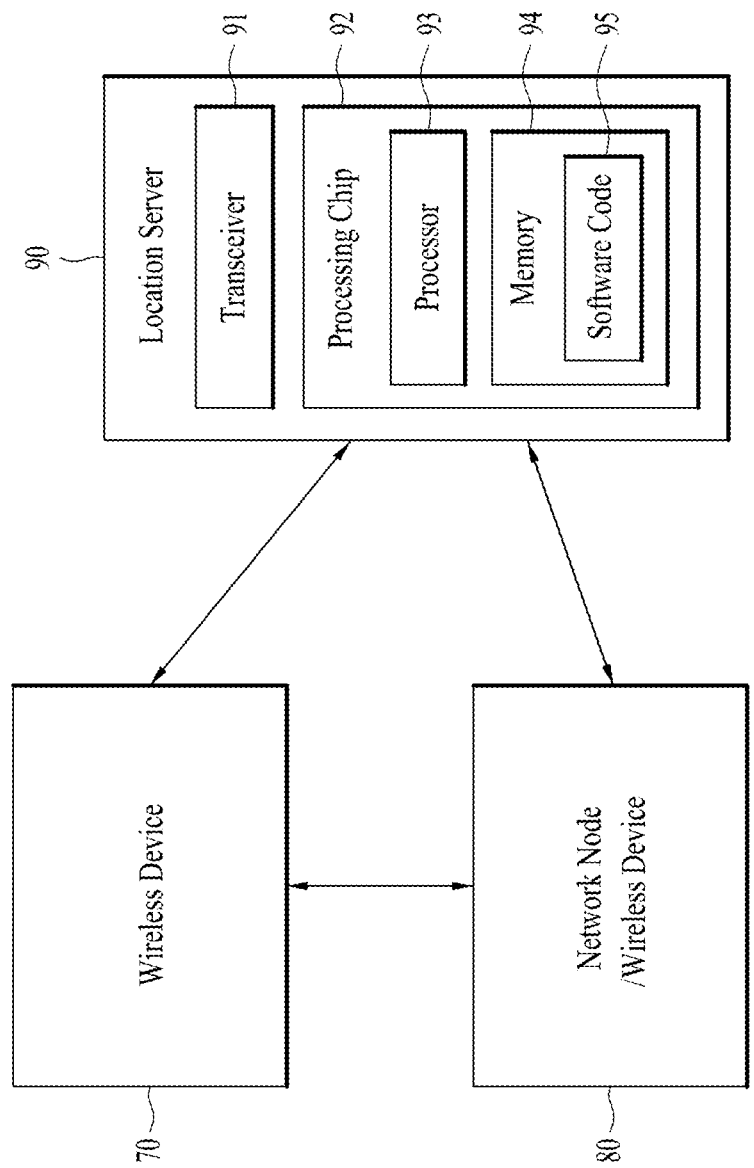
FIG. 33 is a diagram illustrating an exemplary location server to which embodiments of the present disclosure are applied.

The location server illustrated in FIG. 17 may be a device illustrated in FIG. 33. In other words, the operation of the location server illustrated in FIG. 17 may be performed by the device illustrated in FIG. 33.

With reference to FIG. 18, a schematic operational implementation example in the network will be described.

Referring to FIG. 18, the BS may transmit, to the location server, information including a notification of using an SS/PBCH block and/or a CSI-RS as PRS resources or for the purpose of determining a Tx/Rx beam for transmitting/receiving PRS resources (S1800). The location server may transmit PRS resource configuration information to the BS and/or the UE, and the BS may transmit the PRS resource configuration to the UE (S1801 to S1805). If the location server transmits the PRS resource configuration information to both the BS and the UE, the BS may not perform step S1803. That is, when the location server transmits the PRS resource configuration information to both the BS and the UE, the BS may not transmit the PRS resource configuration information to the UE. However, if the location server transmits the PRS resource configuration information only to the BS, the BS may transmit the PRS resource configuration information to the UE. In other words, if step S1805 is omitted, step S1803 may be compulsory. That is, steps S1803 and S1805 may be selectively performed. A specific example of the PRS resource configuration information may be based on the later-described embodiments.

The BS may transmit at least one of a PRS, an SS/PBCH block, or a CSI-RS to the UE (S1807). The UE may transmit a report related to the at least one of the PRS, the SS/PBCH block, or the CSI-RS to the BS and/or the location server, and the BS may transmit the report related to the at least one of the PRS, the SS/PBCH block, or the CSI-RS to the location server (S1809 to S1813). If the UE transmits the report to the location server, step S1811 may not be performed. That is, the BS may not forward the report to the location server. However, if the UE transmits the report only to the BS, the BS may forward the report to the location server. In other words, if step S1813 is omitted, step S1813 may be compulsory. That is, steps S1811 and S1813 may be selectively performed. Specific information included in the report and a method of transmitting the report may be based on the later-described embodiments.

The following embodiments may be implemented individually or in combination. In other words, one or more of the embodiments may be implemented in combination.

Unless otherwise specified, an entity responsible for "configuration/indication" may be a BS, a BS or location server performing a positioning operation, or a similar physical/logical node. An entity receiving the configuration/indication is a UE. In the following description, all of a terminal, a user, and a mobile station (MS) may mean a UE.

To configure a specific PRS for a UE, for example, by a PRS configuration parameter "PRS-Info" in 3GPP TS36.355, a PRS unit/resource and/or a PRS resource group/set may be defined as a PRS configuration unit. For example, a PRS configuration may include a configuration of a PRS resource ID, an occupied bandwidth, a periodicity, and the number of consecutive slots carrying a PRS, for each PRS resource. Further, one or more PRSs (e.g., PRS resources or PRS IDs) may be configured as one PRS resource group/set. For example, a plurality of PRS IDs may be configured as one PRS group/set.

Further, the UE may determine that PRSs (e.g., PRS resources or PRS IDs) transmitted in a specific PRS resource group/set are from TPs/BSs at the same location. Alternatively, the location server or the BS may configure/indicate for/to the UE that PRSs (e.g., PRS resources or PRS IDs) transmitted in a specific PRS resource group/set are from TPs/BSs at the same location. When it is said that TPs/BSs are at the same location, this may imply that the TPs/BSs are at the same geographic location. Further, the TPs/BSs at the same geographical location mean the same TP/BS.

The location server or the BS may configure/indicate for/to the UE that different PRSs (e.g., PRS resources or PRS IDs) transmitted in a specific PRS resource group/set are on the same Tx beam. For example, the BS or the location server may configure/indicate spatial quasi-colocation (QCL) (e.g., QCL type D) between PRSs (e.g., PRS resources or PRS IDs) in a specific PRS resource group/set for/to the UE.

Further, when spatial QCL is configured between PRSs (e.g., PRS resources or PRS IDs) in a specific PRS resource group/set, the UE may expect the different PRSs to be transmitted on the same Tx beam from the same TP/BS. In other words, the UE may expect different PRSs included in a specific PRS resource group/set to be transmitted from the same TP/BS, and expect PRSs configured with spatial QCL (e.g., QCL type D) among the different PRSs to be transmitted on the same Tx beam. That is, one PRS resource or one PRS ID may be associated with one Tx beam, and if the same spatial QCL is configured between different PRSs corresponding to different PRS IDs, the different PRSs may be transmitted on the same Tx beam.

In the following description, a PRS resource may be a unit for configuring a PRS and/or PRS configuration parameters including a PRS bandwidth, a PRS configuration ID, PRS muting information, the number of slots in a PRS occasion, and a PRS occasion group length, like PRS configuration parameters "PRS-Info" in TS36.355.

Configuring a PRS at a PRS resource level may be favorable for a narrow beam-based system such as NR. Because the LTE system is based on a wide beam, one PRS is configured for a reference cell such as a serving cell, and a neighbor cell/TP in the LTE system. That is, "PRS-Info" is configured for each of the reference cell and the neighbor cell. In contrast, a specific TP/BS sweeps multiple beams in a narrow beam-based manner in the NR system. Therefore, a TP/BS is highly probable to transmit a PRS on a narrow Tx beam instead of a common beam. Particularly, the TP/BS may have a higher probability of transmitting a PRS on a narrow Tx beam at or above 6 GHs.

From the perspective of a UE which receives a plurality of PRSs on different Tx beams, measurements of the PRSs such as time of arrivals (ToAs), reference signal time differences (RSTDs)/reference signal received powers (RSRPs), or signal to nose ratios (SNRs) may be different. Accordingly, the UE needs to distinguish the PRSs transmitted on the different Tx beams from each other.

For this purpose, a different PRS may be transmitted in a different PRS resource by a different Tx beam, so that the UE may be aware that PRSs transmitted in different PRS resources are on different Tx beams. For example, although different PRS resources may share time and/or frequency resources, at least different PRS IDs and/or different PRS sequences may be configured for the different PRS resources in order to enable the UE to distinguish the PRS resources. In other words, PRS resources may include PRS IDs and PRS sequences as well as time and/or frequency resources. Accordingly, different PRSs may differ in at least one of PRS time resource, PRS frequency resource, PRS ID, or PRS sequence.

Now, a description will be given of a specific method of configuring/indicating a PRS by a BS and/or a location server, for improving positioning performance and performing efficient UE positioning for a low-end UE to which only a narrowband PRS is available.

In Embodiment 1 to Embodiment 7 described below, a PRS resource set may include at least one PRS resource. In other words, a PRS resource set may refer to a group of at least one PRS resource. Further, a PRS resource set may be identical to a PRS block in its meaning. Accordingly, the terms PRS resource set and PRS block are interchangeably used with each other in the following embodiments. Specifically, a PRS resource set may be a group of a plurality of PRS resources corresponding to one cell/BS/TP. Further, a PRS block may be a plurality of PRS resources corresponding to at least one cell/BS/TP. In other words, from the perspective of one cell/BS/TP, a PRS block may be identical to a PRS resource set.

Further, at least one PRS resource set or at least one PRS block may form a PRS block group. In other words, a PRS block group may refer to a group of at least one PRS resource set or a group of at least one PRS block.

Further, the term PRS block group is interchangeable with PRS occasion. That is, a PRS block group and a PRS occasion may be used in the same meaning in the present disclosure. Further, a PRS resource set may be configured on a BS/TP basis. In other words, one PRS resource set may be configured for one BS/TP.

Embodiment 1

In the NR system, both a narrowband such as 5 MHz and a wideband are supported for NR positioning. Therefore, the NR system should be able to support various types of UEs and improved positioning performance irrespective of UE capabilities in order to apply OTDOA. For example, the following three types of UEs may be considered to apply OTDOA in the NR system.

Type A: a UE of type A may process a wideband PRS without any limitation.

Type B: a UE of type B may have certain hardware limitations, for example, in a processing capability and/or a battery lifetime, and may process a wideband PRS.

Type C: a UE of type C may have certain hardware limitations, for example, in a processing capability and/or a battery lifetime, and may process only a narrowband PRS.

For UEs of type A, it may not be difficult to provide a high positioning accuracy by lots of RSTD measurements together with a high OTDOA-based sampling rate. However, UEs such as UEs of type B or type C may need a method of improving a positioning accuracy, while overcoming hardware limitations.

Figure 19A:
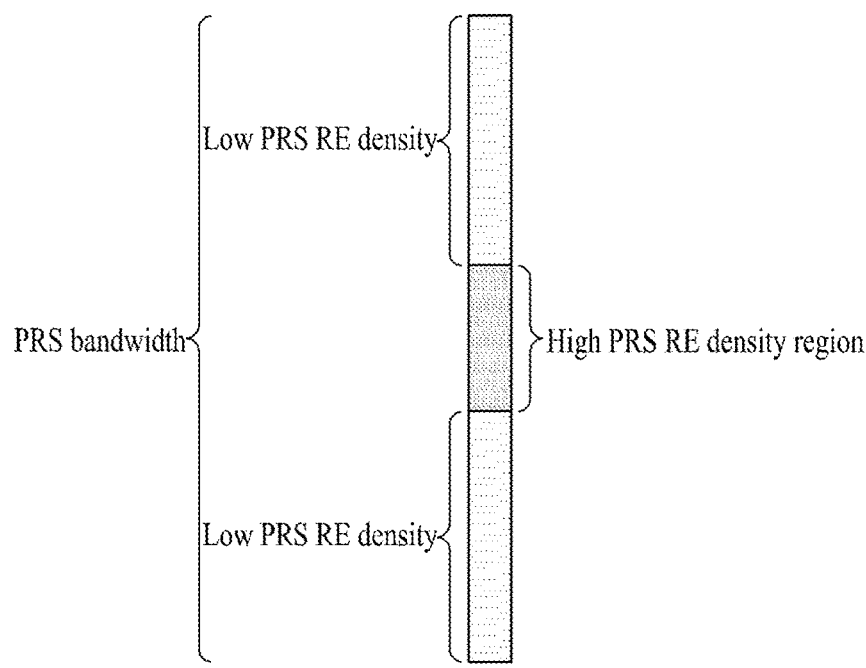
FIGS. 19A and 19B are diagrams illustrating an embodiment of PRS allocation according to the present disclosure.

In an OTDOA operation of the NR system, a TP/BS may transmit a wideband PRS and a UE of type C may receive only a limited part of the wideband PRS. Therefore, to improve the positioning accuracy of the UE of type C, a high PRS RE density may be set for an RB in a frequency bandwidth accessible to the UE of type C, as illustrated in FIG. 19A.

A more accurate positioning performance may be supported for a UE of type B than for a UE of type C because the UE of type B may additionally use a frequency bandwidth to increase the positioning accuracy. However, apart from the UE of type A, support of wideband PRS-based OTDOA for the UE of type B involves hardware limitations, which makes intensive research necessary to provide a high positioning accuracy to the UE of type B. As one approach, use of both ODTOA-based high and low sampling rates may be considered.

For example, a PRS measurement obtained at a low sampling rate may be used as prior information useful to both a target UE and the BS/location server before a high sampling rate-based OTDOA operation, to reduce computational complexity and enhance RSTD measurement. The low sampling rate and high sampling rate-based OTDOA may be supported in terms of UE implementation, or may be explicitly indicated by a BS configuration such as a narrow bandwidth-based PRS and a wide bandwidth-based PRS to assist with a flexible NR bandwidth configuration such as various bandwidth parts (BWPs).

For example, when configuring PRSs or PRS resources, the location server and/or the BS may configure/indicate different PRS RE densities according to time and/or frequency resources. For example, when configuring a specific PRS or PRS resource for the UE, the BS and/or the location server may set a high or low PRS RE density only for a specific bandwidth or specific RBs on the frequency axis. That is, when configuring a PRS and/or a PRS resource, the BS and/or the location server may configure/indicate one or more PRS RE densities. Further, BWPs or RBs for which the one or more PRS RE densities are to be configured may be configured/indicated by a bitmap or the like.

For example, a high PRS RE density may be set/allocated only for/to a frequency band available to a UE of type C which is capable of using only a narrowband PRS to increase the positioning performance of the UE of type C.

Figure 19B:
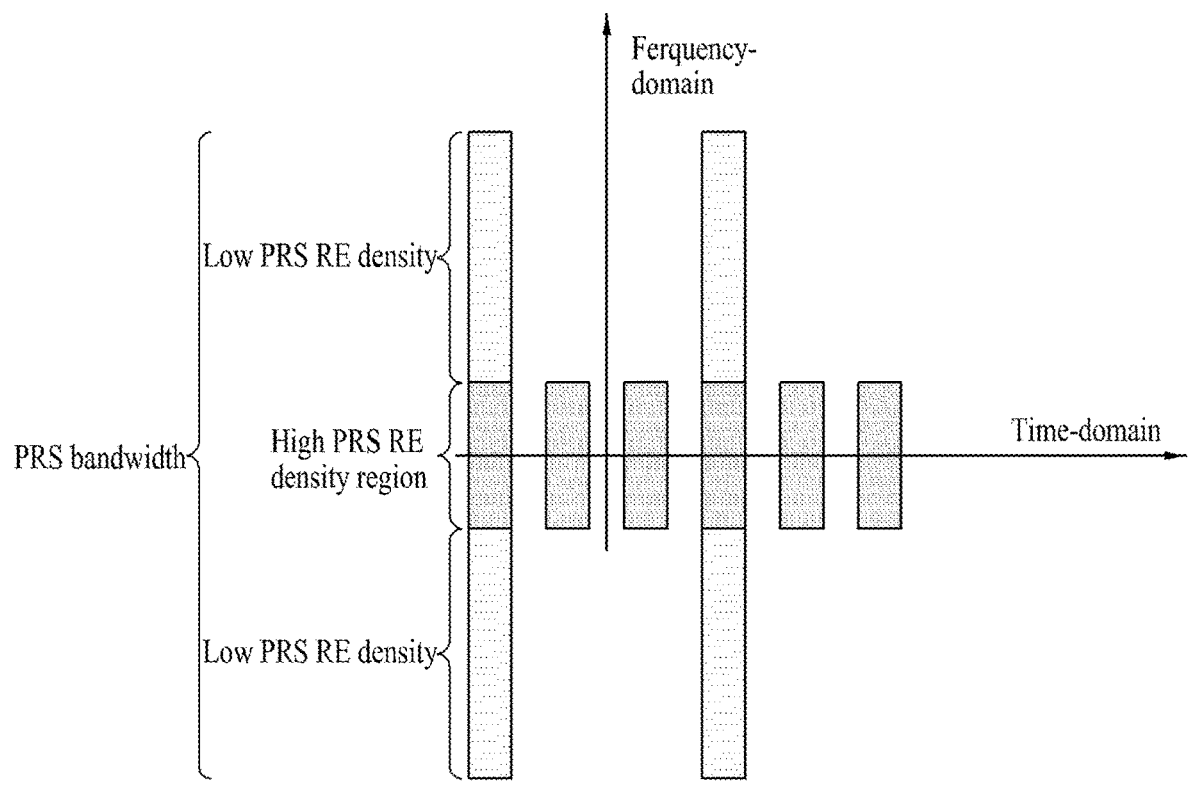

Alternatively, when configuring a PRS or a PRS resource for a UE, the location server and/or the BS may configure/indicate a different PRS repetition number according to a PRS frequency bandwidth and/or PRS RBs. That is, the BS and/or the location server may set a different PRS density only for a specific bandwidth and/or specific RBs on the time axis in a bandwidth carrying the PRS. For example, a larger PRS repetition number may be set for a PRS corresponding to a "high PRS RE density region" than for a PRS corresponding to a "low PRS RE density" region, as illustrated in FIG. 19B.

In another example, when one PRS occasion includes four slots, it may be configured that the PRS of the "high PRS RE density region" is transmitted in all of the slots, whereas the PRS of the "low PRS RE density region" is transmitted in a part of the slots.

To perform OTDOA, there is a need for a procedure of matching beam correspondence between a target UE and a BS/TP. For this purpose, a beam management process of the NR system may be used or an independent beam management process may be separately introduced for OTDOA.

Figure 20A:
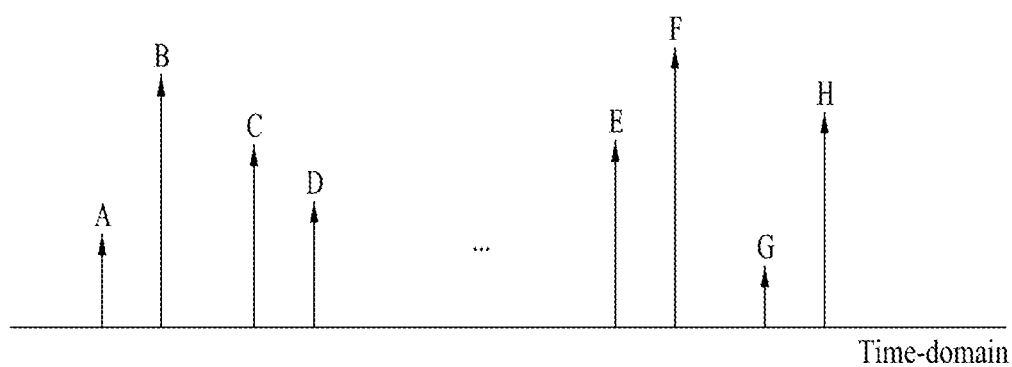
FIGS. 20A and 20B are diagrams illustrating an embodiment of reporting position-related information according to the present disclosure.

This will be described in greater detail. To detect a beam pair for OTDOA-based positioning between a UE and a BS/TP, the BS or the location server may configure the UE or indicate to the UE to detect a beam pair having a shortest ToA instead of beams having a largest RSRP between the UE and the BS. A ToA may be determined based on the position of a first peak of received signals, as illustrated in FIG. 20A. That is, among signals A to H received on a plurality of beams, a ToA may be determined based on the position of a first peak A, and a beam pair may also be determined based on the position of the first peak A.

Figure 20B:
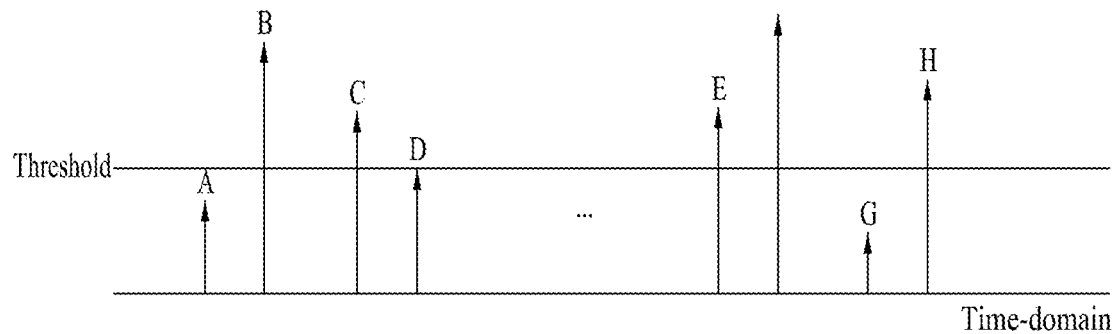

However, if the RSRP is very small or a noise level is much higher than a signal level at the first peak, it may be difficult to conduct reliable communication through a beam pair corresponding to the first peak A. Accordingly, when the RSRP of the first peak is equal to or less than a specific threshold, a ToA may be determined based on the position of a second peak B, and a beam pair may also be detected based on the second peak B, as illustrated in FIG. 20B. Further, when the UE reports information about the beam related to the ToA to the BS and/or the location server, the UE may also report information about a reception strength such as the RSRP of the beam.

Specifically, a method of detecting a beam pair by the beam management process of the current NR system will be described. For example, a CSI-RS for L1-RSRP measurement, that is, a CSI-RS for beam management may be used. The BS and/or the location server may configure the UE or indicate to the UE to report a CSI-RS resource index corresponding to a minimum ToA and/or the ToA value, for CSI-RS resources included in a specific CSI-RS resource set with a higher-layer parameter "repetition" set to "on" or "off". For example, this may be indicated/configured to/for the UE by a reporting setting.

Specifically, when the BS and/or the location server allocates one of three CSI-RS resource sets with repetition set to "off" to each of three TPs, each CSI-RS resource set may include a plurality of CSI-RS resources. The TPs may transmit the respective CSI-RS resources on Tx beams in different directions. Further, the UE may be indicated/configured to measure a ToA for each CSI-RS resource and select and report a CSI-RS resource indicator (CRI) with a shortest ToA, for each CSI-RS resource set. Each TP may transmit a PRS, using a Tx beam corresponding to the reported CRI as a reference beam.

Further, the UE may select a reference beam for a PRS beam of a neighbor BS/TS by using a CSI-RS for L3-RSRP measurement and/or an SS/PBCH block, and report the selected reference beam to the BS. The UE may measure the ToAs of SS/PBCH blocks received from a BS/TP of a neighbor cell, select the index of an SS/PBCH block with a shortest ToA, and report the SS/PBCH block index, so that the neighbor cell may use the SS/PBCH block as a reference beam based on which a PRS Tx beam is determined.

An exemplary independent beam management procedure for OTDOA may be given as follows. A PRS may be used to match Tx/Rx beam correspondence between a neighbor BS/TP and a target UE. The BS and/or the location server may configure/indicate some PRS occasions, specific slots carrying a PRS, or some period of a PRS transmission for the purpose of Tx/Rx beam detection for/to the UE. The PRS used for Tx/Rx beam detection may be configured/indicated separately from a PRS configured/indicated for RSTD measurement, and may have a lower PRS RE density on the time and/or frequency axis than the PRS for RSTD measurement.

Figure 21:
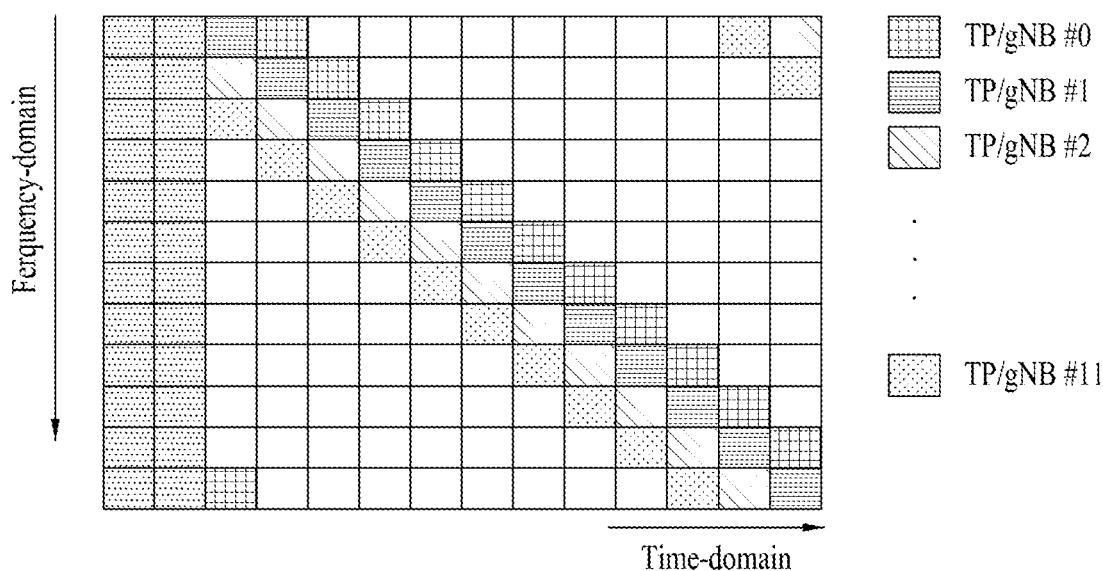
FIGS. 21 to 26B are diagrams illustrating embodiments of allocating PRS resources in a slot according to the present disclosure.

For example, as illustrated in FIG. 21, if 10-Tx beam sweeping is possible for each of 12 TPs/BSs, a PRS resource set/group may be allocated to each TP/BS and 10 PRS resources may be configured/allocated for/to each PRS resource set/group. Each TP/BS may transmit the PRS resources corresponding to the TP/BS, while performing Tx beam sweeping during the duration of 10 symbols.

In other words, each of the 12 TPs/BSs may use one RE in each symbol, and transmit a PRS by a different Tx beam in a different PRS resource in each symbol, except for the first two symbols corresponding to a control channel region.

The UE may be configured/indicated to report a PRS resource index with a shortest ToA in a PRS resource set/group transmitted by each TP/BS to the BS and/or the location server. For the UE, the PRS RE density may be increased to 2 or larger for a PRS transmitted after a PRS occasion and/or PRS slots for Tx/Rx beam sweeping, and the UE may recognize that PRS resources are transmitted on the same Tx beam from a specific TP/BS, except for the PRS occasion and/or PRS slots configured/indicated for Tx/Rx beam sweeping, and form an Rx beam suitable for paring with the same Tx beam. Alternatively, the UE may be configured/indicated to form an Rx beam suitable for reception of a specific PRS resource by the BS and/or the location server.

Further, an RE pattern for PRS transmission may be designed/defined/configured for each TP/BS or each specific TP group/BS group in association of a symbol carrying a PDCCH to mitigate interference caused by use of the same time-frequency resources for PRSs transmitted by the TPs/BSs. For example, when a total of 12 TPs/BSs are divided into two groups each including 6 TPs/BSs, the first two symbols may be configured for PDCCH transmission from the first group, and the third and fourth symbols may be configured for PDCCH transmission from the second group to always avoid interference between the two groups in the first four symbols.

Embodiment 2: PRS Resource Configuration and PRS Resource Group/Set Configuration PRS resources may be configured/indicated/defined by one or more of the following configuration parameters in combination as configuration parameters for a PRS having an independent PRS ID, such as "PRS-INFO" for the LTE PRS. Compared to the LTE system in which one LTE PRS is configured for each TP/BS, a PRS resource may be one resource in a PRS resource set in the NR system. Further, a PRS transmitted from a specific TP/BS may be configured/indicated for/to the UE in a plurality of PRS resources and/or a plurality of resource groups/sets. Further, it may be very important to configure PRS resources by all or a part of the following parameters in such a manner that different TPs/gNBs/BSs having different Tx beam sweeping numbers/periodicities may effectively transmit PRSs without interfering with each other. This will be described in detail in Embodiment 3.

Parameters for PRS configuration
1) PRS ID/index or PRS resource ID/index
2) PRS transmission time offset This may be configured/indicated in units of X(>=0) slots/symbols. Further, a PRS transmission time offset may be a PRS transmission time offset between TPs/BSs, that is, a PRS transmission time difference between the TPs/BSs. For example, the PRS transmission time offset may be the difference between a PRS transmission time of a first TP/BS and a PRS transmission time of a second TP/BS. The first TP/BS may correspond to a serving cell or a reference cell, and the second TP/BS may correspond to a neighbour cell other than the serving cell or the reference cell.

3) Time-domain behaviour related to PRS transmission

Periodic PRS transmission/semi-persistent PRS transmission/aperiodic PRS transmission. If periodic PRS transmission is configured, a transmission periodicity may be configured at a time or slot level, such as X(>0) ms or Y(>0) slots.

4) Bandwidth information

For example, bandwidth information may be indicated as occupied RB indexes or as a starting RB index and the number of occupied RBs. If the bandwidth information is indicated as the occupied RB indexes, the occupied RB indexes may be indicated by a bitmap. A BWP ID or system bandwidth information may be indicated together with or separately from the bandwidth information.

5) Time/frequency RE density

Density configurations for a plurality of PRS REs included in one PRS resource may be different according to frequency resources such as RBs or time resources such as symbols/slots/blocks (occasions). For example, a PRS RE density may be configured according to the difference between the RE densities of a center RB and an edge RB.

6) Occupied symbol(s) information

This may be represented as the number of OFDM symbols or symbol indexes.

7) Frequency RE offset for occupied PRS symbols

For example, a per-symbol frequency carrier RE offset may be configured for each of OFDM symbols including a specific PRS resource, and/or one frequency RE offset may be configured/indicated for total OFDM symbols including one PRS resource.

8) Quasi Co-Location (QCL) information

For example, QCL information may be represented as RS and/or RS set information. For example, the QCL information may be represented as an RS and/or RS set ID.

9) Rx panel information of UE

For example, this may be represented as an Rx panel ID.

Even though different PRS resources share the same time-frequency resources, different PRS resource IDs or PRS scrambling IDs may be configured/indicated for the PRS resources. For example, different PRS resource IDs may be allocated to PRS resources sharing the same time-frequency resources, so that the PRS resources use different PRS sequences and thus are distinguished from each other.

As such, configuring a PRS on a PRS resource basis may be favorable for a narrow beam-based system such as the NR system. Because the LTE system is based on a wide beam, only one PRS is configured for a reference cell such as a serving cell, and a neighbor cell/TP in the LTE system. That is, "PRS-Info" is configured for each of the reference cell and the neighbor cell.

In contrast, a specific TP/BS sweeps multiple beams in a narrow beam-based manner in the NR system. Therefore, a TP/BS is highly probable to transmit a PRS on a narrow Tx beam instead of a common beam. Particularly, the TP/BS may have a higher probability of transmitting a PRS on a narrow Tx beam at or above 6 GHs. Because PRSs transmitted on different Tx beams may have different measurements such as ToAs/RSTDs/RSRPs/SNRs, the UE needs to distinguish the PRSs transmitted on the Tx beams from each other. Therefore, a different PRS may be transmitted in a different PRS resource by a different Tx beam, so that the UE may be aware that PRSs transmitted in different PRS resources are on different Tx beams. Although different PRS resources may share time and/or frequency resources, at least different PRS IDs and/or different PRS sequences may be configured for the different PRS resources in order to enable the UE to distinguish the PRS resources.

In other words, when it is said that PRS resources are different, this may mean that PRS IDs and/or PRS sequences as well as time and/or frequency resources for PRS transmission are different in the present disclosure. Accordingly, different PRSs may differ in at least one of PRS time resource, PRS frequency resource, PRS ID, or PRS sequence.

Further, one or more PRS resources may be configured/indicated as one PRS resource group/set. Further, it may be configured/indicated for/to the UE that PRS resources included in a specific PRS resource group/set are transmitted from the same TP/BS.

Accordingly, PRS resources and/or PRS resource sets may be configured such that Tx beams and/or TPs/BSs may be distinguished from each other by PRS resources and/or PRS resource sets in a wireless communication system performing Tx beam sweeping in which a plurality of Tx beams are switched over time.

For example, PRS resource set/group IDs may not be separately configured/indicated. Rather, the PRS resource set/group IDs may be replaced with cell/TP/BS IDs. For example, when a PRS is configured, PRS resources may be configured in conjunction with the ID of a specific neighbor cell/TP/BS, so that a plurality of PRS resources linked to a specific cell/TP/BS ID may be considered/recognized/configured as one PRS resource group/set. That is, a cell/TP/BS ID may be considered/recognized/configured as a PRS resource set/group ID. Alternatively, one PRS resource set/group may be configured/indicated for/to the UE in conjunction with specific TP/cell/gNB information.

The following embodiments are implementation examples of a method of configuring PRS resources.

(1) Embodiment 2-1

The BS and/or the location server may configure/indicate time/frequency resources (e.g., time/frequency REs) used/ occupied by one PRS resource for/to the UE such that a PRS is configured/transmitted using every subcarrier RE at least once in an RB configured with/carrying a specific PRS resource. For this purpose, per-symbol frequency RE offsets may be configured/indicated for all symbols configured with the specific PRS resource.

PRS resources may be mapped to Tx beams used for PRS transmission from a specific TP/BS, in a one-to-one correspondence. Further, the UE may be configured/indicated to independently obtain and report the measurements of PRSs transmitted on different Tx beams, such as ToAs, RSTDs, or AOAs, on a Tx beam basis.

Further, in the case where a first peak is detected by cross-correlating PRS signals to measure a ToA, an RSTD, or the like, the first peak may be detected more accurately and more easily when the PRSs are transmitted in all subcarriers than when the PRSs are not transmitted in a specific subcarrier. Accordingly, considering that a specific PRS resource may be transmitted in a plurality of symbols, use of all subcarriers for PRS resource mapping may be favourable in terms of PRS measurement.

(2) Embodiment 2-2

Rx panel information for the UE may be configured/indicated for/to the UE by a PRS reporting configuration for PRS measurement. For example, a PRS reporting configuration for a specific PRS resource and/or PRS resource set may configure/indicate reporting of measurement information for a specific Rx panel. For example, the PRS reporting configuration may configure/indicate reporting of a reporting setting of a CSI framework.

The reception hearability of a PRS signal transmitted by each TP/BS may be different greatly depending on the Rx panel directionality of the UE. Therefore, because a measurement such as ToA, RSTD, and AoA may be different depending on the Rx panel direction of the UE, if the BS has at least rough knowledge of the Rx panel direction of the UE, the BS may indicate to the UE to receive a PRS at a specific Rx panel, which may be favourable in terms of complexity, time delay for PRS transmission and reception, and/or performance.

(3) Embodiment 2-3

When Rx panel information is not configured/indicated separately for/to a UE having a plurality of Rx panels, the UE may report a value indicated by the BS, selectively by a reporting quantity such as a ToA, an RSTD, and/or an AoA. And/or in the case of ToA or RSTD reporting, the UE may report the smallest of ToA and/or RSTD measurements of the plurality of panels. For example, even though the BS or the location server does not transmit a configuration/indication related to measurement reporting to the UE, the UE may assign a high priority to the smallest ToA and/or the smallest RSTD and report the smallest ToA and/or the smallest RSTD.

(4) Embodiment 2-4

Despite the absence of a separate configuration/indication, the UE may consider/assume the same Tx beam during the duration of OFDM symbols in which a specific PRS resource is configured. Alternatively, the BS may implicitly/explicitly configure the UE or indicate to the UE to consider/assume the same Tx beam during the duration of OFDM symbols in which a specific PRS resource is configured.

The above-described Embodiment 2 may be summarized as follows.

1) PRS block (or PRS occasion) configuration

When one Tx beams is included in one PRS block, one or more PRS resources may be configured for each TP/BS. When a plurality of PRS resources are configured, an Rx beam sweeping operation may be explicitly configured/indicated for/to the UE.

2) In the case where one PRS block corresponds to one or more Tx beams, if a single Tx panel is used, the number of Tx beams for each TP/BS in a PRS block may be equal or different, like a plurality of Tx beams in TDM. Each Tx beam may correspond to one or more PRS resources.

On the contrary, when multiple Tx panels are used as in the case of configuring a plurality of Tx beams in the same time/frequency resources, different PRS resources may share all or a part of time/frequency REs and may be spatially distinguished from each other. The different PRS resources may use the same or different PRS sequences.

Similarly to the LTE system, a PRS may be transmitted/configured in a group of a plurality of symbols/slots or a group of specific blocks in the NR system. However, it is important to design/configure a PRS transmission unit in consideration of beam sweeping at a transmission/reception end in the NR system. Further, the PRS transmission unit may be configured in the form of repetitions of the same PRS block or repetitions of different PRS blocks.

Now, a description will be given of specific implementation examples of a method of allocating PRS resources including a PRS block configuration, a method of configuring a PRS Tx/Rx beam, and a PRS measurement method as mentioned in Embodiment 1 and Embodiment 2, with reference to Embodiment 3 to Embodiment 7.

Embodiment 3: PRS Block Configuration

A PRS block may be configured/defined by the following elements. The BS or the location server may configure/indicate a PRS block for/to the UE by one or more of the following pieces of PRS block information.

1) Information about consecutive or distributed OFDM symbols carrying a PRS

For example, the information may include the indexes of symbols or the number of symbols, occupied for PRS transmission.

2) Physical cell/BS/TP ID(s) and/or the number of cells/BSs/TPs that transmit PRSs in the consecutive OFDM symbols 3) PRS resource information and PRS resource group/set information For example, the information may include a PRS resource ID and/or a PRS resource set ID, time/frequency resource information for PRS transmission, or time/frequency RE mapping information. Further, a PRS resource set may be configured on a BS/TP basis. In other words, one PRS resource set may be configured for one BS/TP.

4) Explicit or implicit information about a specific Tx beam used in a corresponding physical cell/BS/TP For example, the information may include one or more PRS resource IDs and a plurality of PRS resource IDs related to spatial QCL information.

5) information about a PRS RE density on the time/frequency axis for each cell/BS/TP and/or each PRS resource 6) Information about a TX/RX panel of the UE or the BS and/or Tx/Rx beam information such as a Tx/Rx panel ID of the UE
:
For example, the UE may be indicated/configured to perform a measurement and/or reporting operation only with a specific Rx panel of the UE, for a PRS transmitted in a specific PRS block.

7) Tx/Rx beam information about the UE or the BS
The Tx/Rx beam information may include spatial QCL reference information configured for a PRS resource and/or a PRS resource group/set.

8) Frequency reuse factor, K
This is information about the number of different TPs/BSs/cells transmitting PRS REs in the same OFDM symbol in one PRS block. In the LTE system, six TPs/cells may transmit PRSs at the same time. In this case, the frequency reuse factor is 6, and the frequency RE density of the PRSs is 2.

The frequency reuse factor may be the number of PRS resources transmitted simultaneously in a specific OFDM symbol of one PRS block, and the frequency RE density of the PRS resources may be determined/configured/indicated as 12/K.

9) Repetition factor
Repeated transmissions of the same PRS RE pattern and/or specific PRS resources may be configured/indicated. When an Rx SNR/RSRP improvement operation based on Rx beam sweeping of the UE and/or coherent Rx combining of the UE at a PRS block group level is considered/configured/indicated, the repetition factor may be used as a configuration parameter for a PRS block group. Coherent Rx combining may refer to reception of a signal (e.g., a PRS) a plurality of times by the same Rx beam to improve an SNR/RSRP.

10) The number of Rx beam sweepings at the UE
The repetition number of one PRS block or one PRS sub-block may be determined according to the number of Rx beam sweepings of a target UE. That is, an Rx beam sweeping factor of the UE may be configured instead of the repetition factor. However, even though the number of Rx beam sweepings at the UE is N, a specific PRS block or PRS sub-block may be transmitted repeatedly in consideration of the distance between the specific target UE and a TP. Accordingly, the Rx beam sweeping factor and the repetition factor of the UE may be configured independently.

In the present disclosure, a PRS block in which the same PRS resource is not transmitted repeatedly is referred to as a PRS sub-block. That is, a PRS sub-block may be considered to be a special case of a PRS block. Further, a PRS occasion may be constructed/configured/indicated in the form of repetitions of a PRS block, for Rx beam sweeping of the UE or for increasing an Rx SNR/RSRP for a PRS transmission in the present disclosure.

However, when one PRS block is designed to be repetitions of a specific PRS RE pattern in consideration of both Tx and Rx beam sweeping operations, one PRS block may be defined/interpreted as one PRS occasion. However, when a PRS occasion is associated with a specific Tx/Rx beam, the PRS occasion may be defined/determined as repetitions of a plurality of PRS blocks in the NR system.

Further, different PRS blocks may share all or a part of time/frequency resources, and may be transmitted on different Tx beams at the same time. Further, the PRS blocks may be transmitted in different frequency resources in the same OFDM symbols. Further, the PRS block/PRS sub-block/PRS occasion may be indicated/configured to/for the UE by the BS and/or the location server.

(1) Embodiment 3-1

A PRS occasion or a PRS block may be defined/configured by using information related to consecutive OFDM symbols in which PRS REs transmitted from one or more TPs/BSs are configured and/or information related to a TP/cell and or PRS resources that transmit a PRS in consecutive OFDM symbols. Further, information about the PRS block may be configured/indicated for/to the UE by the BS or the location server. Further, a PRS transmitted from a specific TP/BS during the duration of one PRS block may be configured to use all frequency REs of an RB configured with the PRS at least once. In other words, the PRS block may be constructed/configured such that there is no unused subcarrier RE (subcarrier tone) in the PRS block. A PRS block may be configured/defined with explicit/implicit linkage to Tx beam information for PRS transmission from a TP/BS in the PRS block. The PRS block may be constructed/configured/indicated as follows based on the information.

1) PRS block configured with a single Tx beam of each TP/gNB (or TP/BS)

The BS or the location server may associate a PRS transmitted in one PRS block from a specific TP/BS only with the same one Tx beam. In this case, one PRS block may be a group of one or more OFDM symbols in which one or more TPs/BSs transmit PRSs on the same Tx beam. The PRS transmitted over the one or more OFDM symbols may be configured/constructed such that every subcarrier RE of a PRS RB is used at least once.

One-to-one mapping between Tx beams and PRS resources may be configured. The total number of PRS resources may be configured/defined for each TP/BS in correspondence with the number of available/required Tx beam sweepings of the TP/BS.

Alternatively, one-to-many mapping between Tx beams and PRS resources may be configured. However, because a specific TP/BS is allowed to use only one Tx beam in a PRS block, the UE may be aware that a plurality of PRS resources are associated with the same Tx beam without a separate indication/configuration. The plurality of PRS resources may be included in a specific PRS resource set/group.

When a specific TP/BS transmits a plurality of PRS resources or a PRS resource group/set in one PRS block, the same spatial QCL may be configured/indicated for the PRS resources or the PRS resource group/set. Further, as one-to-many mapping between Tx beams and PRS resources may be configured, the UE may be configured/indicated to measure and/or report a ToA, an RSTD, or the like for each Rx beam, while changing Rx beams. Further, a PRS resource set may be configured on a BS/TP basis. In other words, one PRS resource set may be configured for one BS/TP.

2) PRS block configured with multiple Tx beams of each TP/gNB (or TP/BS)

A PRS block may be designed/constructed/defined/configured in consideration of a Tx beam sweeping operation in which a TP/BS changes a Tx beam over time during PRS transmission. For example, a PRS block may be configured in consideration of the Tx beam sweeping periodicities of all TPs/BSs transmitting PRSs in the same PRS block. A configuration or indication of the number of OFDM symbols included in the PRS block and/or the time/frequency RE density of the PRS block may be different depending on whether each of the TPs/BSs transmitting PRSs in the same PRS block has the same number of or a different number of Tx beams. For example, a PRS block may be configured such that one PRS resource is associated with one Tx beam or one Tx beam is associated with a plurality of PRS resources.

Tx beams may be mapped to PRS resources in a one-to-one correspondence. The total number of PRS resources may be configured/defined for each TP/BS in correspondence with the number of available/required Tx beam sweepings of the TP/BS.

Alternatively, one-to-many mapping between Tx beams and PRS resources may be configured. When a specific TP/BS transmits one or more PRS resources or one or more PRS resource groups/sets in one PRS block, the same spatial QCL may be configured/indicated for the PRS resources or the PRS resource groups/sets.

Further, as one-to-many mapping between Tx beams and PRS resources is configured, the UE may be configured/indicated to measure and/or report a ToA, an RSTD, or the like for each Rx beam, while changing Rx beams. For this purpose, it may be indicated to the UE that PRS resources or a PRS resource group/set is transmitted on the same Tx beam by a separate parameter. For example, when a CSI-RS resource set is configured, a separate configuration parameter such as a higher-layer parameter "repetition" (on/off) used to enable the UE to assume that TPs/BSs use the same Tx beam may also be used in a PRS resource configuration and/or a PRS resource set configuration.

The time and/or frequency RE density of a PRS block or PRS resources may be configured or indicated by the BS or the location server. The time and/or frequency RE density of a PRS block or PRS resources may serve as a basis for configuring or indicating a PRS block and/or PRS resources in consideration of a beam sweeping range required for a specific TP/BS and/or the distances between target UEs and the specific TP/BS. Particularly, it may be important to configure a PRS block and/or PRS resources based on the time and/or frequency RE density of the PRS block and/or the PRS resources to support effective UE positioning in a narrow beam-based 5G system.

A specific implementation example of a PRS block configuration method will be described based on the above description. It is assumed that a PRS may be a UE group-specific signal in the following implementation examples.

Figures 22A, 22B:
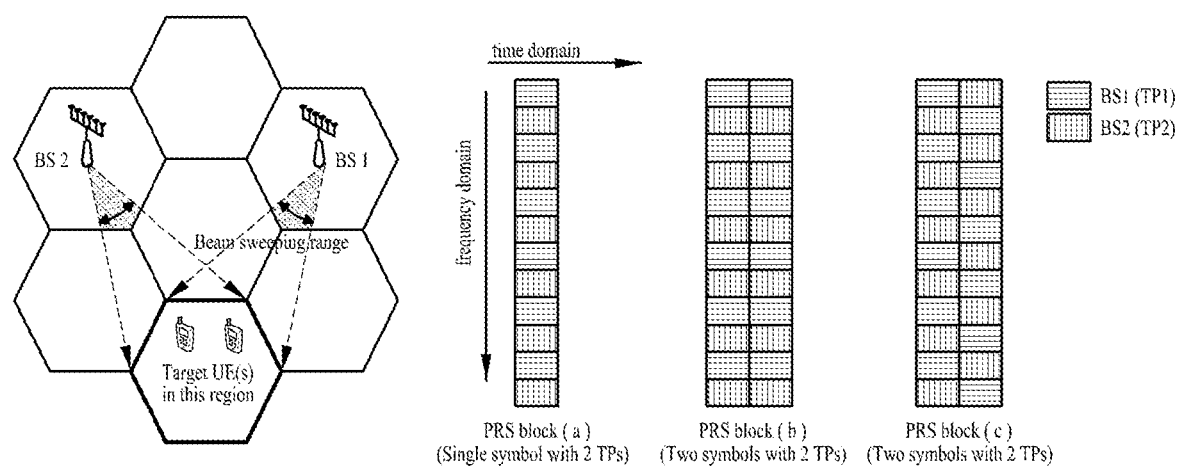

Referring to FIG. 22A, a target UE is located in a specific cell outlined in bold, and all neighbour cells transmit PRSs to the target UE.

With BS1 and BS2 focused on in the following description, BS1 and BS2 transmit PRSs to the specific cell in which the target UE is located. As illustrated in FIG. 22A, wide beam sweeping ranges may not be required in this case. Therefore, each of BS1 and BS2 may only have to transmit the PRS on one beam without beam sweeping.

Further, because BS1 and BS2 are similar in the distances to the target UE and the beam sweeping ranges, a BS or location server responsible for positioning may configure/define PRSs from BS1 and BS2 in one PRS block for the UE. For example, a PRS block with a frequency PRS RE density of 6 may be configured, as illustrated in FIG. 22B.

Specifically, referring to 'PRS block (c)' of FIG. 22B, a different frequency offset may be configured in each symbol, for each TP/BS, so that the TP/BS may use all subcarrier REs across two OFDM symbols. Further, a first peak may be measured more accurately through cross-correlation in 'PRS block (c)' of FIG. 22B than in 'PRS block (b)' of FIG. 22B. Therefore, it may be appropriate to configure a per-symbol frequency RE offset for all OFDM symbols in which a PRS block and/or PRS resources are included.

(2) Embodiment 3-2

A PRS block may be configured or indicated only with TPs/BSs having the same number of Tx beam sweepings for PRS transmission. For example, it may be configured or indicated that only PRS resource groups/sets including the same number of PRS resources among different PRS resource groups/sets are included in one PRS block. Further, a PRS resource set may be configured on a BS/TP basis. In other words, one PRS resource set may be configured for one BS/TP.

Additionally, a PRS block may be configured only when time/frequency resources (e.g., time/frequency REs) occupied by one PRS resource are allocated such that every subcarrier RE included in an RB carrying a specific PRS resource is used at least once.

Figure 23A:
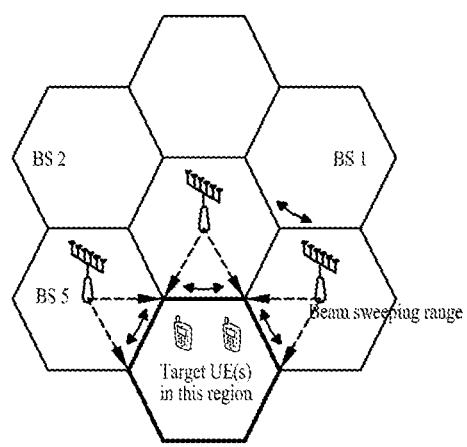
Figure 23B:
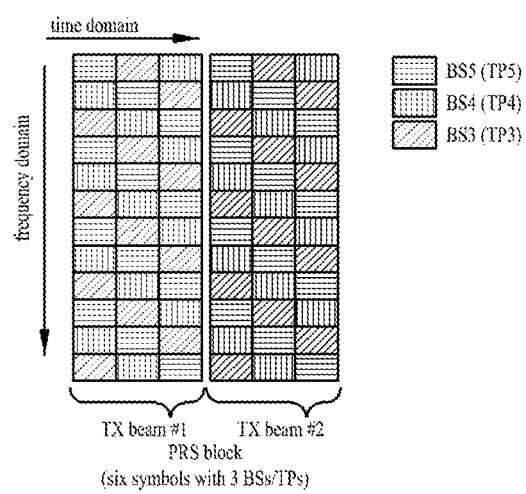

For example, referring to FIG. 23A, BS3, BS4 and BS5 transmit PRSs. BS3, BS4 and BS5 have wider beam sweeping ranges than BS1 and BS2. Therefore, when each of BS3, BS4 and BS5 transmits a PRS on one Tx beam, a coverage problem may occur. Accordingly, BS3, BS4 and BS5 may need a multiple Tx beam sweeping operation. As illustrated in FIG. 23B, if each BS transmits a PRS by two Tx beam sweepings, uses three OFDM symbols per Tx beam, and sets a PRS RE density of 4 on the frequency axis, with PRS REs arranged equi-distantly, a PRS block including six OFDM symbols may be configured.

In this case, a different PRS RE offset on the frequency axis may be configured for each symbol, from the perspective of each BS/TP, so that all subcarrier REs may be occupied during the duration of the three symbols. For example, if the PRS subcarrier RE offsets of the three symbols are set to 0, 1, and 2 for BS5, PRS resources may be configured as illustrated in FIG. 23B. Further, different PRS resource IDs or different PRS scrambling IDs may be assigned to PRSs associated with Tx beam #1 and Tx beam #2 to distinguish the different beams from each other, although the PRSs share time/frequency resources. Further, the BS or the location server may configure or indicate different PRS resources for or to the UE such that the time/frequency resources of the PRS resources are completely independent of each other.

In other words, the UE may measure or estimate a ToA by cross-correlating a PRS received on Tx beam #1 with a PRS received on Tx beam #2.

Further, BS1 and BS2 are farther from the target UE than BS3, BS4 and BS5 in FIGS. 22A and 23A. Therefore, to increase the reception SNR/RSRP, one PRS block and/or one PRS block group/set may be configured as repetitions of a PRS block structure such as 'PRS block (c)' in FIG. 22B.

(3) Embodiment 3-3

Figure 24:
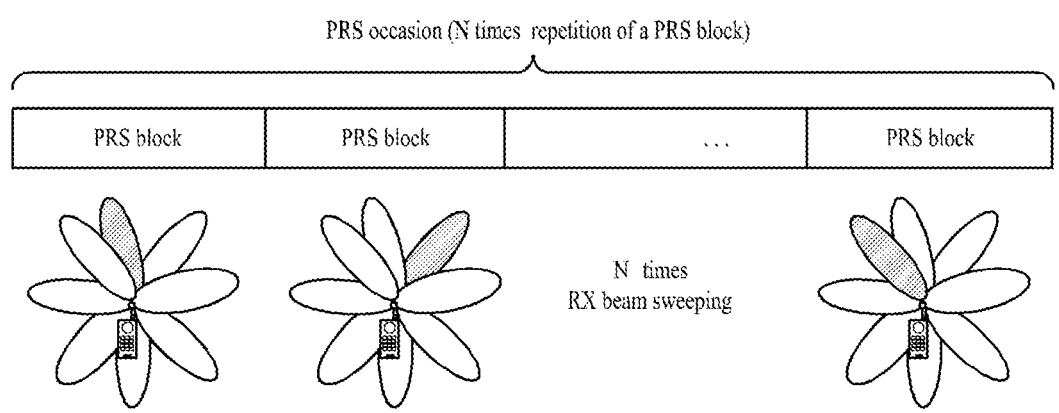

Referring to FIG. 24, when a PRS is configured, it may be configured or indicated that a specific PRS RE pattern or a specific PRS resource is repeated in one PRS block group (or PRS occasion). For example, a "repetition parameter" which is an independent parameter for configuring/indicating PRS block and/or PRS block group may be used and a PRS transmission pattern such as one PRS block may be configured to equally repeated to N times through a separate independent configuration parameter (e.g., "repetition factor"). Particularly, when a PRS block group is configured, N-times repetitions of a PRS block in the PRS block group may be configured or indicated by an explicit configuration parameter (e.g., repetition factor) indicating N-time repetitions of the same PRS. The PRS block may include at least one PRS resource. For example, the PRS block may include PRS resource sets for at least one BS/TP/cell.

Accordingly, a PRS block may be identical to a PRS resource set in its meaning from the viewpoint of one cell/BS/TP. Repetitions of at least one PRS resource in a PRS block may be configured for the BS and/or the UE by the location server or for the UE by the BS. That is, the time duration of the PRS block group in which at least one PRS resource included in one PRS is repeated may be equal to or larger than the product between at least one PRS resource duration and the repetition factor 'N'. A PRS block group and a PRS occasion may be used in the same meaning. In other words, a PRS occasion may have a duration equal to the transmission periodicity of a PRS resource set/PRS block, and at least one PRS resource included in a PRS resource set/PRS block may be repeated 'N' times during the duration of the PRS occasion. That is, at least one PRS resource is allocated 'N' times within the total time duration of a PRS occasion/PRS block group, with no PRS resource in the remaining period except for the 'N' repetitions of the PRS resource. Further, a PRS resource set may be configured on a BS/TP basis. In other words, one PRS resource set may be configured for one BS/TP.

When a PRS block and/or a PRS block group is periodically transmitted, a repetition number of a PRS transmission pattern such as a PRS block may be configured for a PRS block and/or a PRS block group transmitted in a specific period. Further, the UE may be configured or indicated to measure the ToAs, RSTDs, and/or AoAs of PRS resources of N-time repeated PRS blocks, while changing an Rx beam N times, and/or report the measurements.

Embodiment 3-3 may be favourable in supporting a positioning operation in the narrow beam-based NR system. For example, because BS1/BS2 is farther from the target UE than BS3/BS4/BS5 in FIGS. 25A and 25B, BS1/BS2 needs to transmit a PRS repeatedly and hence improve the reception SNR or hearability performance of the PRS.

Figure 25A:
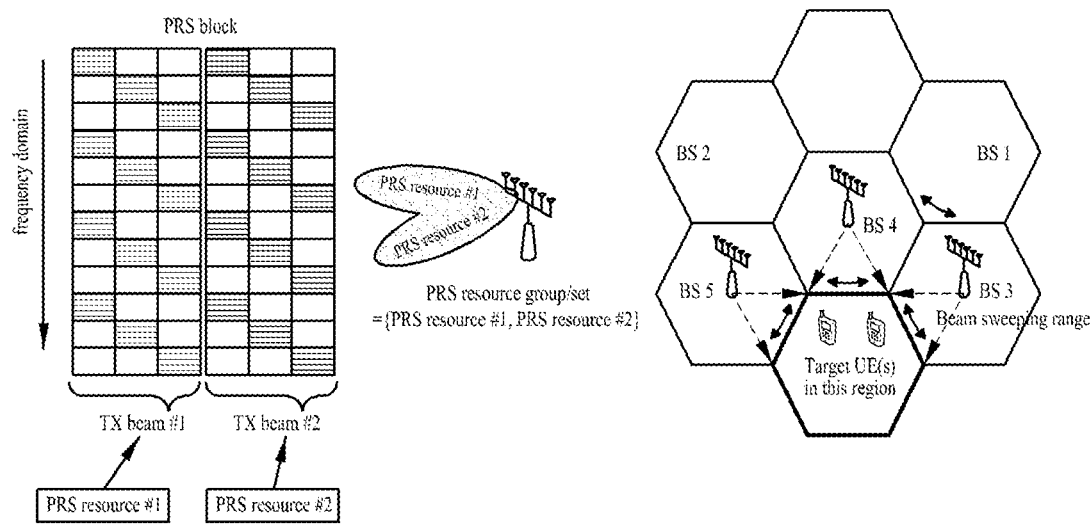
Figure 25B:
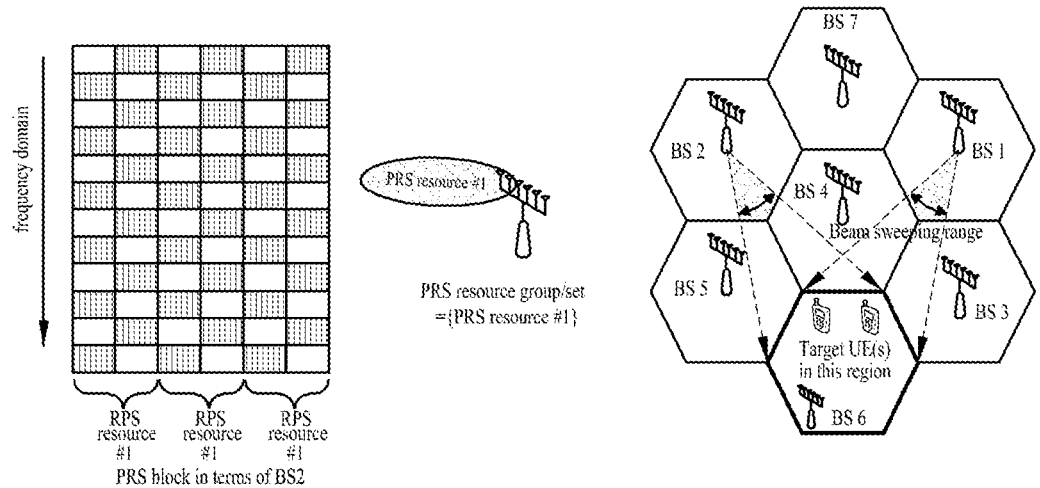

For this purpose, although beam sweepings in BS3, BS4 and BS5 outnumber beam sweepings in BS1 and BS2, BS1 and BS2 may repeat PRSs three times to improve reception SNRs/hearability, as illustrated in FIG. 25B. Referring to FIG. 25B, a PRS block (i.e., PRS RE pattern) associated with BS2 may be transmitted repeatedly. As PRS resource #1 from BS2 is configured to span six OFDM symbols, BS2 may transmit a PRS over six symbols like a PRS block including PRSs from BS3, BS4, and BS5.

With reference to FIGS. 24 to 25B, a specific example of repeating PRS resources in a PRS occasion in FIG. 24 will be described. Referring to FIG. 25A, PRS resource #1 and PRS resource #2 may be allocated adjacent to each other in one PRS resource set. A group of these adjacent PRS resource #1 and PRS resource #2 may be transmitted as many times as a repetition factor 'N', as illustrated in FIG. 24. As illustrated in FIG. 25B, PRS resource #1 included in a PRS resource set may be transmitted repeatedly as many times as a repetition factor 'N' in a PRS occasion.

One PRS resource may be associated with one Tx beam. For example, PRS resource #1 may be associated with Tx beam #1, and PRS resource #2 may be associated with Tx beam #2. Therefore, for example, if four Tx beams are available, PRS resource #1 to PRS resource #4 may be used, and a group of PRS resource #1 to PRS resource #4 which have been allocated adjacent to each other may be transmitted repeatedly as many times as a repetition factor 'N'.

(4) Embodiment 3-4

The frequency RE density of PRSs or PRS resources in a PRS block may be configured dependently on an RE/symbol/RB basis. Further, the BS or the location server may configure or indicate the frequency RE density of the PRSs or PRS resources in the PRS block for or to the UE according to the number of TPs/BSs transmitting PRSs simultaneously in one OFDM symbol. For example, if the number of TPs/BSs transmitting PRSs in the same symbol is M, the frequency PRS RE density may be configured or indicated as 12/M REs (or symbols or RBs).

Alternatively, the BS or the location server may configure or indicate the frequency RE density of PRSs or PRS resources in a PRS block on an RE/symbol/RB basis for or to the UE according to the number of PRS resources transmitted simultaneously in one OFDM symbol. For example, if the number of PRS resources transmitted in the same symbol is M, the frequency PRS RE density may be configured or indicated as 12/M REs (or symbols or RBs).

In this case, a TP/BS farther from a target UE may require a smaller beam sweeping range than a TP/BS nearer to the target UE. However, the TP/BS farther from the target UE needs to have an increased repetition number to secure the SNR/RSRP of a PRS received at the target UE. Accordingly, when a PRS block is configured for a PRS transmitted from a TP/BS requiring a large number of Tx beam sweepings, a high PRS RE density may be configured for the TP/BS. In contrast, when a PRS block is configured for a PRS transmitted from a TP/BS requiring a small number of Tx beam sweepings, a low PRS RE density may be configured for the TP/BS. A PRS transmitted from a TP/BS may be PRS resources and/or a PRS resource set. Further, a PRS resource set may be configured on a BS/TP basis. In other words, one PRS resource set may be configured for one BS/TP.

(5) Embodiment 3-5

A different time PRS RE density and/or a different frequency PRS RE density may be configured or indicated for each PRS resource included in a PRS block. For example, a different frequency PRS RE density and/or a different time PRS RE density may be configured or indicated for a per-Tx beam PRS of each of a plurality of TPs/BSs transmitting PRSs in the same PRS block.

Further, the frequency RE densities of PRS resources in one PRS block may be configured or indicated in association with or in conjunction with the numbers of Tx beam sweepings that change over time while the PRSs are being transmitted in the PRS block. Further, the number of OFDM symbols and/or an OFDM symbol duration in a PRS block, in which each PRS resource is included, may be configured or indicated in association with the frequency RE density and the number of Tx beam sweepings of the PRS resource.

For example, as described above, an OFDM symbol duration spanned by a PRS block and/or PRS resources may be configured as a minimum required OFDM symbol to satisfy the condition that "every subcarrier RE in an RB configured with a specific PRS resource is used at least once for PRS transmission".

A higher frequency RE density may be configured or indicated for a PRS resource transmitted in one PRS block from a TP/gNB/BS with a larger number of Tx beam sweepings than a PRS resource transmitted in the PRS block from a TP/gNB/BS with a smaller number of Tx beam sweepings. For example, if a large number of PRS resources are related to a specific TP/gNB/BS among the PRS resources of one PRS block, a relatively high frequency RE density may be configured for the PRS resources. In other words, considering that one PRS resource group/set is associated with a single TP/gNB/BS, and PRS resources included in the PRS resource group/set correspond to a Tx beam of the TP/gNB/BS, if a specific PRS group/set includes more PRS resources than another PRS group/set, a relatively high frequency RE density may be configured or indicated for the PRS resources included in the specific PRS resource group/set.

For example, regarding a plurality of TPs/gNBs/BSs that transmit PRSs in a specific PRS block, the frequency RE density of PRS resources transmitted from each TP/gNB/BS may be configured or indicated in inverse proportion to the number of Tx beam sweepings which is changed over time for PRS transmission in the TP/gNB/BS. For example, when two BSs perform M Tx beam sweepings and N Tx beam sweepings respectively for PRS transmission in the same PRS block, the frequency RE densities of PRS resources transmitted from the BSs may be configured or indicated such that the ratio between the frequency RE densities is N:M.

Figure 26A:
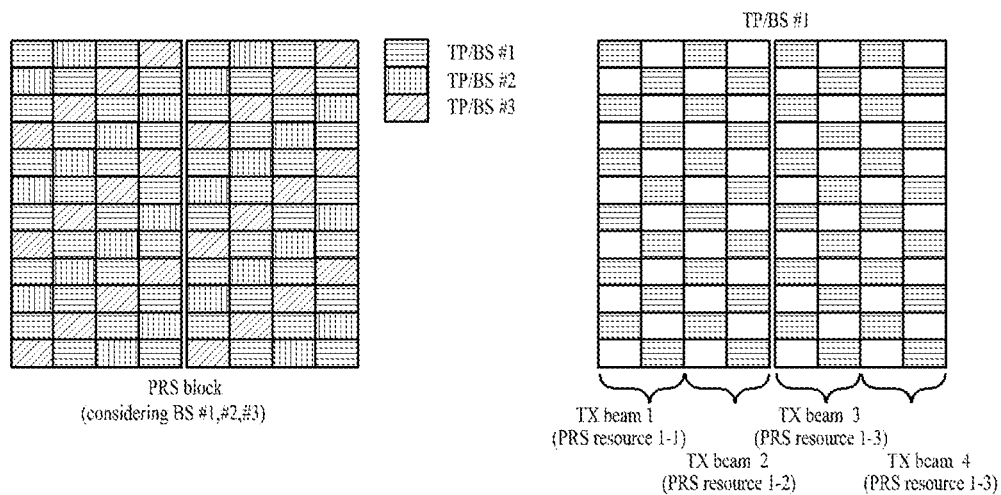

Referring to the left drawing of FIG. 26A, TPs/gNBs/BSs perform different numbers of Tx beam sweepings, for PRS transmission in one PRS block. The PRS block is so configured that the number of Tx beam sweepings is 4 for TP/BS #1, 2 for TP/BS #2, and 2 for TP/BS #3.

Figure 26B:
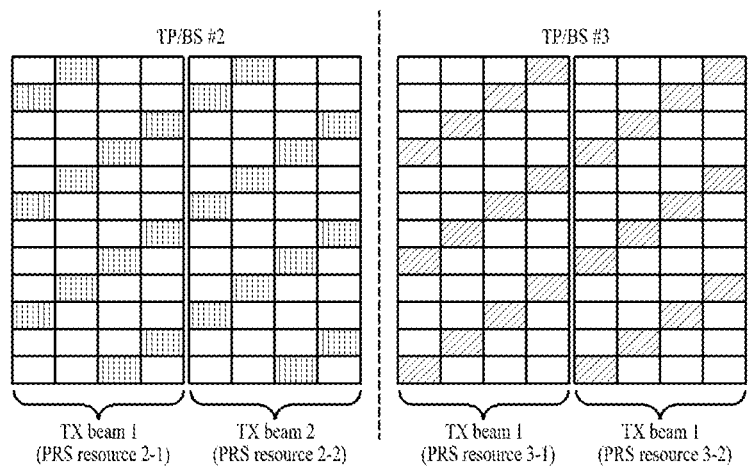

The right drawing of FIG. 26A and FIG. 26B illustrate time/frequency resources occupied by PRS resources of each TP/BS. Referring to FIGS. 26A and 26B, the frequency RE density of four PRS resources transmitted from TP/BS #1 is 6, and the frequency RE density of two PRS resources from each of TP/BS #2 and TP/BS #3 is 3. That is, since TP/BS #1 has twice the number of Tx beam sweepings of TP/BS #2 and TP/BS #3, the frequency RE density may be set to be twice smaller for TP/BS #1 than for TP/BS #2 and TP/BS #3 in FIGS. 26A and 26B.

(6) Embodiment 3-6

The BS or the location server may bundle one or more PRS blocks and configure/define/indicate the bundle as one PRS block group/set.

The PRS block group may be configured or indicated for repeated transmissions of a plurality of PRS blocks. Further, a repetition number may be configured or indicated for each individual PRS block, for repeated transmissions of the PRS block in the PRS block group. For example, a specific PRS block may be repeated in one PRS block group, and this repetition may be configured in conjunction with Rx beam sweeping of the UE. When the UE receives a PRS while changing an Rx beam in each PRS block, the UE may receive PRS blocks of the same pattern and measure RSTDs, TOAs, or AoAs of each PRS resource in the PRS blocks. Alternatively, it may be configured that a specific PRS block is repeated in order to increase the reception SNR of the PRS block in consideration of the distance between a BS and a target UE.

As described above, repeated transmissions of a PRS block may improve the PRS reception SNR/RSRP performance of the UE, and enable the UE to receive PRSs included in one PRS block by different Rx beams and acquire a measurement such as an RSTD, a ToA, and/or an AoA for each Rx beam of the UE.

A PRS block repeated in a PRS block group/set may be discontinuous in time. Obviously, the PRS block may be continuously repeated. For example, even though a specific PRS block is repeatedly transmitted in consecutive slots, the PRS block may be repeated distributedly in the presence of a region carrying a PDCCH and/or a UL region in the PRS block group/set according to a slot format.

Further, one or more different PRS block indexes or different PRS block IDs may be included as a PRS block group configuration parameter.

Further, a PRS may be periodically transmitted, with a PRS block group/set used as one transmission unit. For example, when PRS block groups are configured, a transmission periodicity for PRS transmission may be configured or indicated for each PRS block group/set. The transmission periodicity may be different for each PRS block group, and when the PRS block group/set is configured, time offset information for a periodicity may be configured or indicated in order to prevent collision between PRS block groups. For example, a time offset may be configured or indicated as an OFDM symbol offset, a slot offset, or the like.

Further, a specific PRS block group may be configured or indicated in association with a specific Rx panel and/or Rx beam of the UE. For example, a different PRS block group may be configured or indicated for each Rx panel of the UE. The PRS block group/set may include a plurality of different PRS blocks, and the number of times each PRS block is repeated in the PRS block group/set may be configured or indicated. Different BSs/TPs/gNBs may transmit PRSs in different PRS blocks. If the same BS/TP/gNB transmits a PRS in different PRS blocks, a different PRS Tx beam may be used for each PRS block. For example, different PRS resources included in the same PRS resource group/set may be associated with different PRS Tx beams.

4. Embodiment 4: PRS Tx Beam Configuration

Figure 27A:
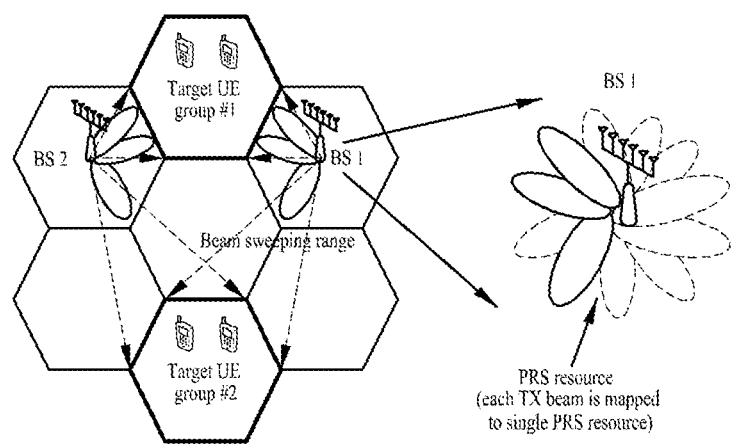
FIGS. 27A and 27B are diagrams illustrating implementation examples of a PRS transmission (Tx) beam configuration according to the present disclosure.

In the narrow beam-based NR system, information about a Tx beam on which a PRS is transmitted may be required to support effective UE positioning. For example, it is assumed that target UEs are divided into two groups as illustrated in FIG. 27A, rather than UE positioning/location estimation is performed for all UEs of a cell/region. When BS1 and BS2 transmit PRSs to target UE group #1 and target UE group #2 in FIG. 27A, it may be effective for BS1 and BS2 to transmit the PRSs only in consideration of necessary Tx beams. In other words, as illustrated in FIG. 27A, a PRS may be transmitted to target UE group #1 on two Tx beams and to target UE group #2 on one Tx beam, based on a required Tx beam sweeping range.

Therefore, BS1 does not need to perform Tx beam sweeping in all directions, and the BS may indicate to the location server or the location server may indicate to the BS that only beams marked with sold lines or PRS resource associated with the beams among all available PRS resources are used as illustrated in the right drawing of FIG. 27A.

(1) Embodiment 4-1

The BS/location server may configure or indicate, for or to the location server/BS, information about a Tx beam for PRS transmission from a specific TP/gNB/cell through a protocol such as NRPPa. For example, information about a Tx beam direction for PRS transmission from a specific TP/BS may be configured or indicated. The information about the Tx beam direction may be information about an angle of the Tx beam direction. For this purpose, the BS/location server may configure or indicate for or to the location server/BS to use only specific PRS resource(s) from among resource set(s) or PRS resource(s) so that only one or more specific PRS resources are used among PRS resource sets or PRS resources available to be used by a specific TP/gNB/cell. For example, a PRS resource set may be configured on a BS/TP basis. In other words, one PRS resource set may be configured for one BS/TP.

For example, each of a plurality of PRS resources included in a specific PRS group may be associated with one of beams transmitted in different directions from each TP/BS, and information about this may be known to the BS and/or the location server. Therefore, as illustrated in FIG. 27A, the BS/the location server may configure or indicate for or to the location server/the BS that only one or more PRS resources associated with one or more specific beam directions are used, so that a PRS may be transmitted only in a necessary direction from a specific TP/gNB/BS by a protocol such as NRPPa.

Further, in the narrow beam-based wireless system, it may be unnecessary for a UE to receive PRSs transmitted in all directions from each TP/gNB/BS due to too a low reception RSRP/SNR or a problem in ToA/RSTD measurement accuracy. Additionally, since reception of PRSs transmitted in all directions may increase latency and overhead, an effective PRS configuration and an effective measurement based on a PRS configuration may be required.

For this purpose, the location server may configure PRS resources UE-specifically and/or UE group-specifically based on information about target UEs and/or target UE groups indicated to the location server/BS by the BS/location server and Tx beam information of each TP/gNB/BS associated with the information about the target UEs and/or the target UE groups, so that the UE may not consider unnecessary Tx beams of a neighbor cell/TP/BS and/or a serving cell/TP.

Figure 27B:
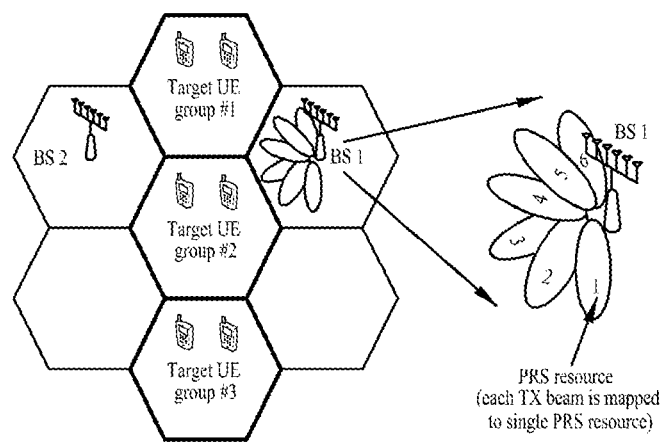

For example, referring to FIG. 27B, it is assumed that there are target UE groups #1, #2, and #3, and BS1 is among BSs that transmit PRSs to the target UE groups. Since BS1 is capable of transmitting a PRS to target UE group #3 by a single Tx beam, only PRS resource #1 out of PRS resources corresponding to the single Tx beam may be configured for target UE group #3. On the other hand, PRS resources #1, #2, and #3 may be configured for target UE group #2, and PRS resources #4, #5, and #6 may be configured for target UE group #1.

(2) Embodiment 4-2

The BS, the location server, or a BS responsible for positioning may configure or indicate, for/to the UE, information about a Tx beam and/or Tx beam group on which a PRS is transmitted from a reference cell/TP/BS and/or a neighbour cell/TP/BS. The Tx beam and/or Tx beam group information may include information about the angle of each Tx beam. For example, the information about the angle may be information about an AoA or angle of departure (AoD). Further, the information about the AoA or AoD may include information about a horizontal angle and information about a vertical angle. Further, the information about the AoA or AoD may be associated with one or more ground control stations (GCSs) or location services (LCSs).

A configuration related to a Tx beam carrying a PRS and/or a configuration related to a PRS resource may be configured or indicated UE-specifically and/or UE group-specifically. For example, when the BS or the location server configures information about a reference cell/TP/BS and/or a neighbour cell/TP/BS for the UE, the BS or the location server may configure or indicate an SS/PBCH block ID or SS/PBCH block index for radio resource management (RRM), a CSI-RS ID or CSI-RS index for RRM, and/or a PRS ID or PRS index along with a specific physical cell ID. The specific physical cell ID may be the ID of a TP/BS associated with a specific physical cell.

To receive a PRS from the reference cell/TP/BS and/or the neighbour cell/TP/BS, use of an Rx beam on which an SS/PBCH block, a CSI-RS, and/or a PRS corresponding to the configured or indicated ID or index may be configured or indicated. For this purpose, the SS/PBCH block, CSI-RS, and/or PRS corresponding to the configured or indicated ID or index may be configured or indicated as a spatial QCL reference for PRS resources, so that the UE may be aware of information about the direction of a Tx beam of the PRS transmitted from the reference cell/TP/BS and/or the neighbour cell/TP/BS.

In other words, to receive a PRS and perform positioning, the UE may receive the PRS in an Rx beam corresponding to an RS transmitted from the serving cell or the neighbour cell, assuming that the RS is spatially QCLed with the PRS received for positioning. For this purposed, the UE may receive the ID of the serving cell or neighbour cell transmitting the RS and information related to the index of the RS assumed to be spatially QCLed with the PRS. The RS may be the afore-described SS/PBCH block, CSI-RS, and/or PRS. Therefore, the index of the RS transmitted together with the ID of the serving cell or the neighbour cell may be the index of the SS/PBCH block, the CSI-RS (e.g., CRI), or the PRS resource. Further, the ID of the serving cell or neighbour cell may be the ID of a TP/BS corresponding to the serving cell or neighbor cell. Further, the BS or the location server may transmit, to the UE, both the ID of the serving cell or neighbour cell and the ID of the TP/BS corresponding to the serving cell or neighbor cell. In other words, the BS or the location server may transmit at least one of the cell ID or the ID of the TP/BS corresponding to the cell to the UE.

If the RS is a PRS, the PRS may be transmitted to determine the Rx beam of a PRS for positioning. For example, upon receipt of a first PRS, the UE may determine an Rx beam based on the first PRS, and receive a second PRS for positioning on the determined Rx beam, assuming that the second PRS is received on the same Rx beam as the determined Rx beam.

Further, spatial QCL between the PRS and the RS may imply that a spatial reception parameter for receiving the RS may be used as a spatial reception parameter for PRS reception, and the use of the same spatial reception parameter may mean the same Rx beam.

When an Rx beam is determined for reception of a PRS for positioning, the Rx beam may be determined through beam sweeping for a plurality of RSs having the same spatial-domain transmission filter. Further, if the plurality of RSs have different spatial-domain transmission filters, the UE may receive the RSs on a fixed Rx beam and receive the PRS, assuming that an RS having the largest RSRP on the fixed Rx beam is QCLed with the PRS for positioning.

Alternatively, referring to FIG. 27B, when a PRS or a PRS resource is configured, information related to a Tx beam direction such as a Tx beam angle may be configured or indicated. Alternatively, the Tx beam direction of the PRS may be predetermined or preconfigured according to the index of the PRS resource. Based on the Tx beam direction, the location server or the BS may configure or indicate a PRS resource and/or a PRS resource group/set UE-specifically and/or UE group-specifically according to a target UE and/or a target UE group.

The PRS resource and/or the PRS resource group/set may be configured or indicated based on the transmission periodicity of a specific PRS block, PRS block group, and/or PRS. Further, AoD information may be indicated or configured implicitly to or for the UE by a PRS resource index. For example, given 12 PRS resources in total, AoD 0 degrees may be set as PRS resource index #1 and AoD 360 degrees may be set as PRS resource index #12, for the UE. In other words, when there are a total of 12 PRS resources, AoDs may be indexed as PRS resources at intervals of 30 degrees. For example, PRS resource index #2 may be related to AoD 30 degrees, and PRS resource index #11 may be related to AoD 330 degrees. That is, a Tx beam direction (e.g., AoD) in which each PRS resource is transmitted may be identified automatically by the UE or configured/indicated for/to the UE by the BS and/or the location server, according to the total number of PRS resources included in a specific PRS resource group/set.

Computing cross-correlations of all PRS resources to acquire measurements of ToAs, RSTDs, or the like may significantly increase computational complexity. If the UE obtains RSTD measurements from PRSs transmitted from a total of M TPs/BSs/cells and receives PRSs on N Tx beams per TP/BS/cell, the UE needs to perform a total of M×N cross-correlation computations. Particularly in a wideband, if M and N are equal to or larger than a predetermined value, the UE may have difficulty in performing cross-correlation computations according to its capability.

Therefore, to reduce the computational complexity, a PRS resource having a maximum RSRP/SNR/SINR may be selected, and a ToA may be calculated by performing a cross-correlation operation only for a PRS received in the selected PRS resource. Further, a statistical error of a ToA/RSTD may be derived from an SNR/SINR, and thus a very accurate association may be detected. Accordingly, a Tx beam carrying a PRS may be detected based on a Tx signal strength such as an SNR/SINR/RSRP, and a cross-correlation operation may be performed for the selected Tx beam.

Embodiment 5: RSRP/SNR and ToA/RSTD

It may be indicated or configured that the UE should measure the ToAs of all PRS resources transmitted from a specific TP/BS/cell and calculate an RSTD based on a PRS resource having a minimum ToA. The PRS resources transmitted from the specific TP/BS/cell may be set as a PRS resource group/set. Further, RSRP measurement using a plurality of PRS resources or one PRS resource group/set transmitted from a specific TP/BS/cell may be indicated or configured to or for the UE.

Further, the UE may be configured or indicated to report the index or ID of a PRS resource having a maximum RSRP/SNR/SINR and/or a ToA and/or RSTD value measured based on the PRS resource having the maximum RSRP/SNR/SINR to the BS or the location server. The measurement and/or reporting configuration may be configured or indicated UE-specifically according to a UE performance level for cross-correlation computation.

Considering that multiple beams and multiple panels are available to the BS and the UE, measurements and/or reports of a ToA, an RSTD, and angle information such as an AoA/AoD using a PRS by the UE may be classified into the following levels.

Tx beam specific
Tx beam group specific
Rx panel specific
Rx panel specific
Rx beam specific
Rx beam group specific Embodiment 6: Measurement/Reporting Configuration in Consideration of Plural Rx Panels The BS or the location server may configure or indicate to the UE to measure and report an RSTD, ToA, and/or AoA on an Rx panel basis.

When the UE is indicated or configured, by the BS or the location server, to report the ToA and/or RSTD measurements acquired from a plurality of Rx panels on an Rx panel basis, the UE may report the smallest of the ToA and/or RSTD values to the BS or the location server. The smallest ToA may be assumed to be the most accurate value. For example, when the UE is configured or indicated to report one RSTD and/or ToA out of the RSTD, ToA, and/or AoA measurements from the plurality of Rx panels, the UE may report the smallest of the ToA and/or RSTD values measured on an Rx panel basis to the BS or the location server.

Further, the BS or the location server may configure or indicate to the UE to measure/report a ToA, RSTD, and/or AoA using a specific Rx panel by indicating the ID of the Rx panel or the index of an Rx beam.

Further, the BS or the location server may configure or indicate to the UE to measure/report the ToAs, RSTDs, and/or AoAs of PRSs transmitted on specific Tx beams, using a specific Rx panel and/or Rx beam. For this purpose, when a PRS resource and/or a PRS resource set is configured for the UE, an Rx panel ID and/or an Rx beam index related to the PRS resource and/or the PRS resource set may be configured or indicated.

Embodiment 7: Rx Beam Sweeping Configuration

Although the UE is capable of generating a plurality of Rx beams, the number of Rx beams that the UE may use at the same time may be limited according to the number of Rx panels at the UE. Therefore, to enable the UE to receive a PRS and measure the ToA, RSTD, and/or AoA of the PRS, while performing Rx beam sweeping in multiple directions, an Rx beam sweeping time unit may be configured/indicated by the BS or preconfigured.

(1) Embodiment 7-1: PRS Block-Level Rx Beam Sweeping

The BS or the location server may configure or indicate to the UE to acquire ToA and/or RSTD measurements, while changing an Rx beam in every PRS block and/or every PRS block group. When a PRS block is repeated in a specific PRS block group, the UE may automatically identify that the PRS resources of each PRS block are transmitted by the same Tx beam. Because a PRS block is designed by reflecting information about Tx beams that each TP/BS sweeps, this UE operation may be appropriate.

The BS or the location server may explicitly configure or indicate that the PRS resources of each PRS block are transmitted by the same Tx beam.

(2) Embodiment 7-2: Sub-Time Unit-Level Rx Beam Sweeping

Multiple repeated transmissions of a PRS block may cause excessive latency. Therefore, reception of a PRS by changing an Rx beam a plurality of times within a single symbol may be considered. In this case, when a PRS block is configured, PRS resources included in the PRS block should satisfy the following conditions.

> Considering subcarrier REs used for all PRS resources included in one PRS block, it should be configured or indicated that the subcarrier REs are equi-distantly used in each symbol included in the PRS block. In other words, the RE patterns of all PRS resources should be configured or indicated such that the PRS resources may be transmitted in interleaved frequency division multiplexing (IFDM) in each symbol included in the PRS block.
>
> Time/frequency resources or time/frequency REs for one PRS resource should be configured such that every subcarrier RE is used at least once in an RB configured with a specific PRS resource.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
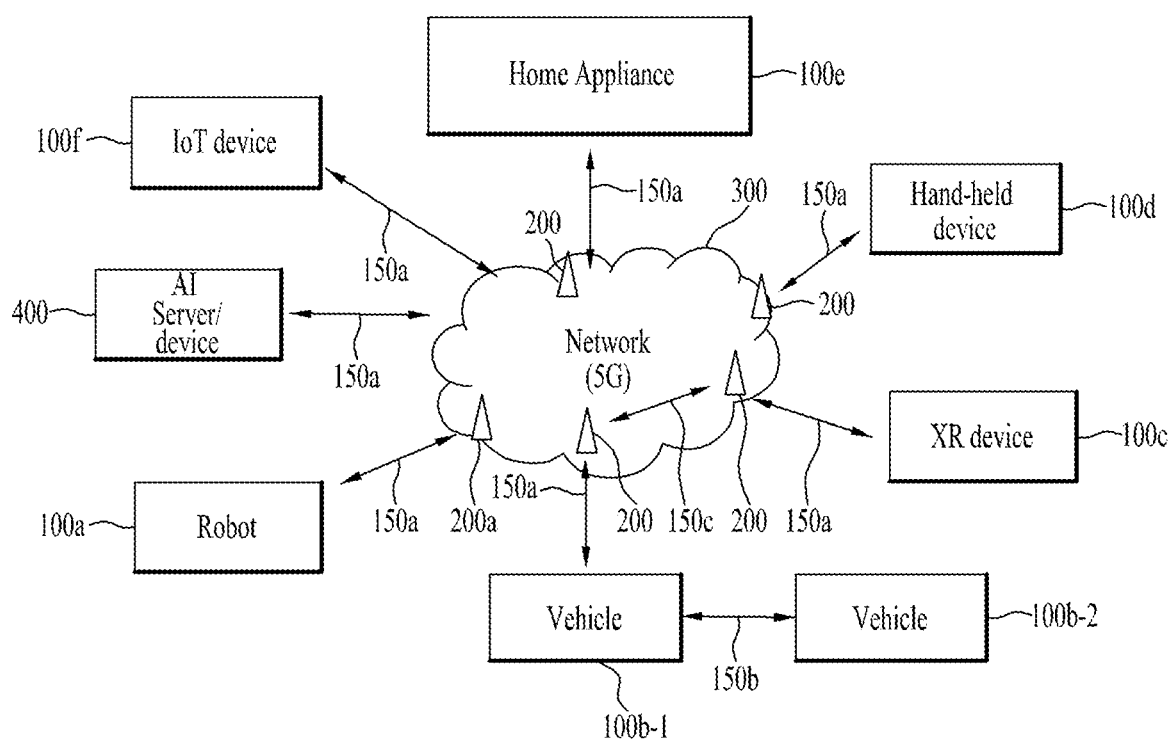
FIG. 28 is a diagram illustrating an exemplary wireless communication system to which embodiments of the present disclosure are applied.

FIG. 28 illustrates a communication system 1 applied to the present disclosure.

Referring to FIG. 28, a communication system 1 applied to the present disclosure includes wireless devices, BSs, and a network. Herein, the wireless devices represent devices performing communication using radio access technology (RAT) (e.g., 5G new RAT (NR)) or long-term evolution (LTE)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 29:
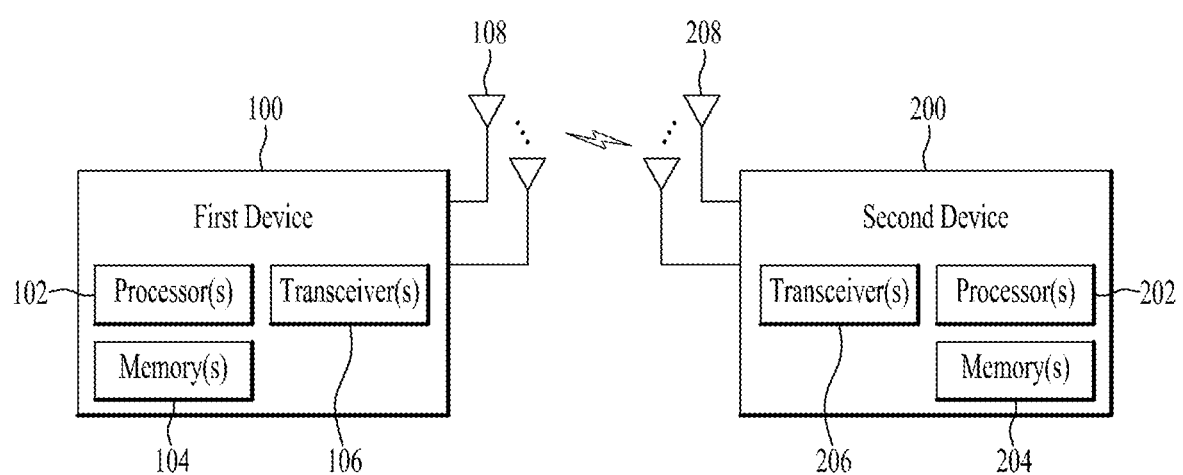
FIGS. 29 to 32 are diagrams illustrating exemplary various wireless devices to which embodiments of the present disclosure are applied.

FIG. 29 illustrates wireless devices applicable to the present disclosure.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIGS. 26A and 26B.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, commands and/or operations controlled by the processor 102 and stored in the memory 104 in the wireless device 100 according to an embodiment of the present disclosure will be described below.

While the operations are described in the context of a control operation of the processor 102 from the perspective of the processor 102, software code for performing these operations may be stored in the memory 104.

The processor 102 may control the transceiver 106 to receive information related to a PRS resource configuration from the second wireless device 200 or the location server 90 of FIG. 33. Specific embodiments of the information related to the PRS resource configuration are based on the foregoing description.

The processor 102 may control the transceiver 106 to receive at least one of a PRS, an SS/PBCH block, or a CSI-RS from the second wireless device, and control the transceiver 106 to transmit a report related to the at least one of the PRS, the SS/PBCH block, or the CSI-RS. Specific information included in the report and a specific method of transmitting the report through the transceiver 106 by the processor 102 may be based on the afore-described embodiments.

Specifically, instructions and/or operations, which are controlled by the processor(s) 202 of the second wireless device 200 and stored in the memory(s) 204, according to an embodiment of the present disclosure, will now be described.

While the following operations are described based on control operations of the processor 202 from the perspective of the processor 202, software code for performing these operations may be stored in the memory 204. The processor 202 may control the transceiver 206 to transmit information including a notification of using an SS/PBCH block and/or a CSI-RS as a PRS resource or for the purpose of determining a Tx/Rx beam to transmit/receive a PRS resource to the location server 90 of FIG. 33.

The processor 202 may configure a PRS resource. The processor 202 may configure the PRS resource by receiving information related to the PRS resource configuration from the location server 90 of FIG. 33. Further, a specific method of configuring a PRS resource may be based on the afore-described embodiments. The processor 202 may control the transceiver 206 to transmit at least one of a PRS, an SS/PBCH block, or a CSI-RS to the first wireless device 100. The processor 202 may control the transceiver 206 to receive a report related to the at least one of the PRS, the SS/PBCH block, or the CSI-RS from the first wireless device 100. Specific information included in the report and a specific method of transmitting the report by the first wireless device 100 may be based on the afore-described embodiments.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 30:
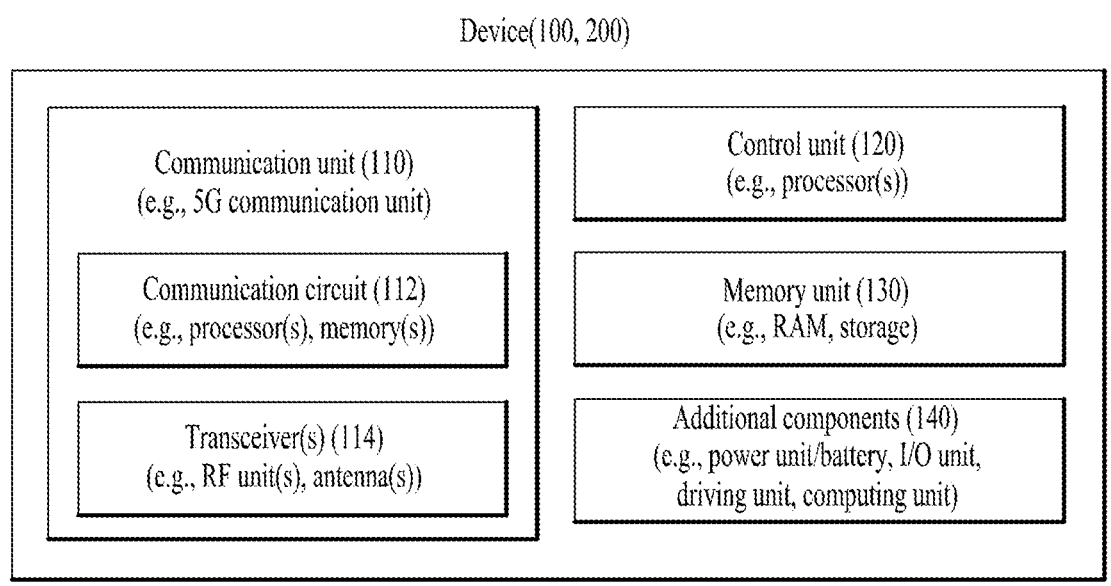

FIG. 30 illustrates another example of a wireless device applied to the present disclosure. The wireless device may be implemented in various forms according to a use-case/service (refer to FIG. 28).

Referring to FIG. 30, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110. Accordingly, the detailed operating procedures of the control unit 120 and the programs/code/commands/information stored in the memory unit 130 may correspond to at least one operation of the processors 102 and 202 of FIG. 29 and at least one operation of the memories 104 and 204 of FIG. 29.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

An implementation example of FIG. 30 will be described in greater detail with reference to the drawings.

Figure 31:
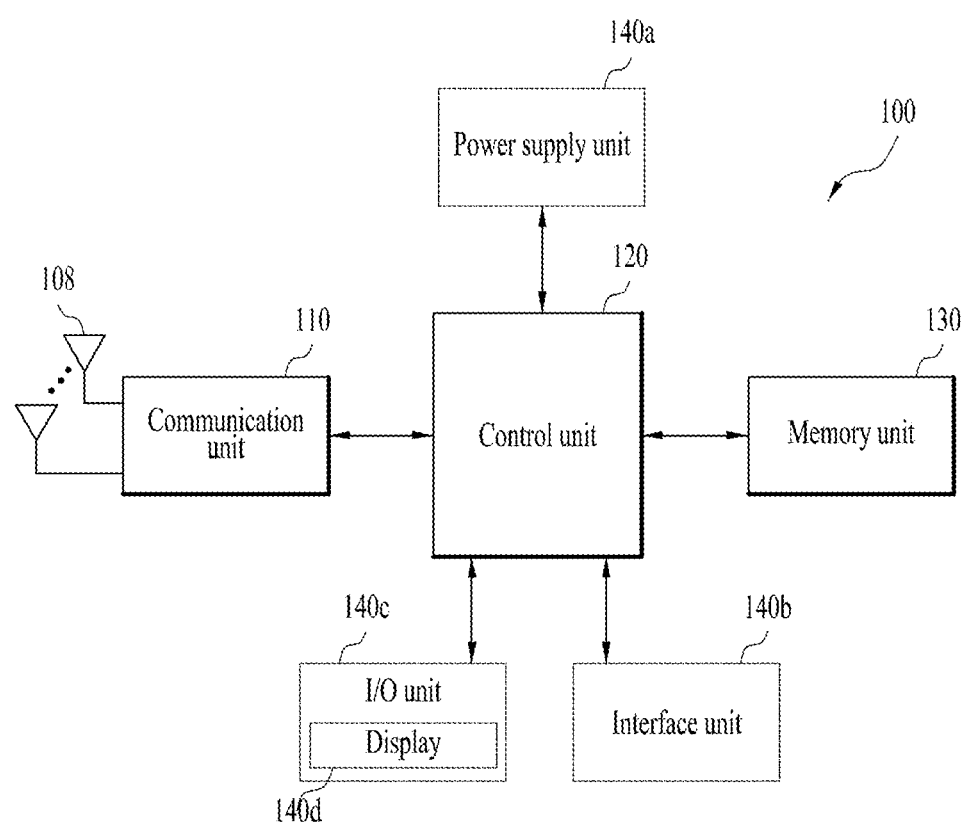

FIG. 31 illustrates a hand-held device applied to the present disclosure. The hand-held device may include a smartphone, a smartpad, a wearable device (e.g., a smartwatch or smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 30, a hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may also store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to the BS. The communication unit 110 may receive radio signals from other wireless devices or the BS and then restore the received radio signals into original information/signals. The restored information/signals may be stored in the memory unit 130 and may be output as various types (e.g., text, voice, image, video, or haptic type) through the I/O unit 140c.

Figure 32:
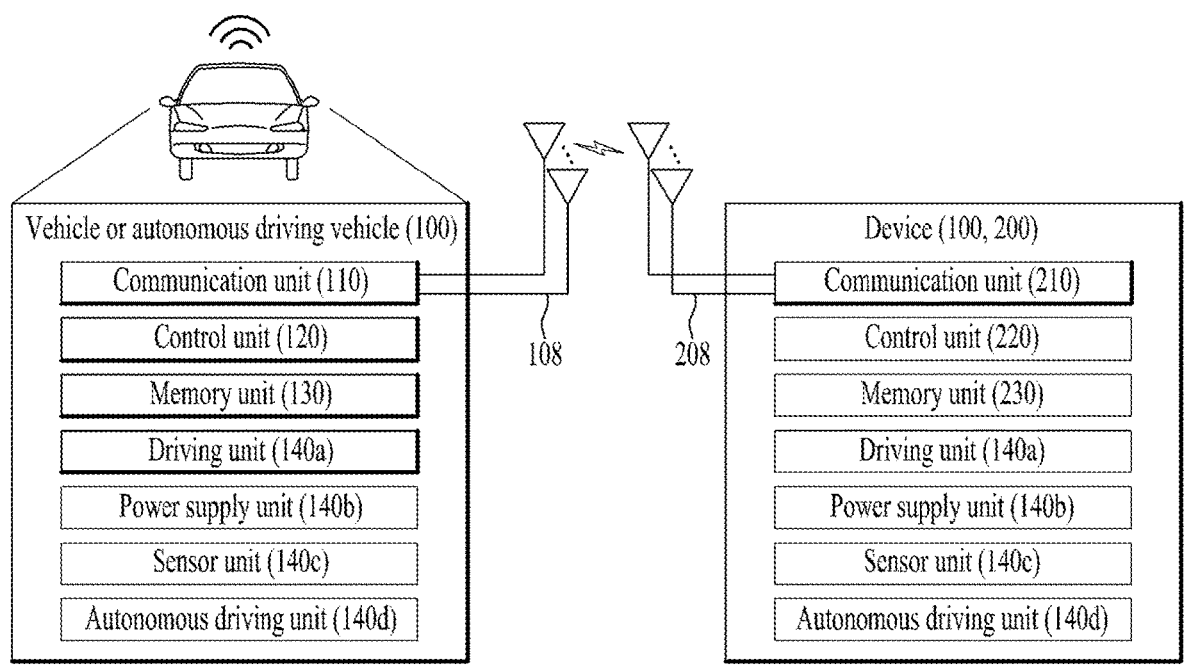

FIG. 32 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 32, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

To perform the embodiments of the present disclosure, there may be provided the location server 90 as illustrated in FIG. 33. The location server 90 may be logically or physically connected to a wireless device 70 and/or a network node 80. The wireless device 70 may be the first wireless device 100 of FIG. 29 and/or the wireless device 100 or 200 of FIG. 28. The network node 80 may be the second wireless device 100 of FIG. 29 and/or the wireless device 100 or 200 of FIG. 30.

The location server 90 may be, without being limited to, an AMF, an LMF, an E-SMLC, and/or an SLP and may be any device only if the device serves as the location server 90 for implementing the embodiments of the present disclosure. Although the location server 90 has used the name of the location server for convenience of description, the location server 90 may be implemented not as a server type but as a chip type. Such a chip type may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions for the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 32 to transmit and receive information.

The processing chip 92 includes a memory 94 configured to store data, programmable software code, and/or other information for performing the embodiments described in this specification.

In other words, in the embodiments according to the present specification, when the memory 94 is executed by at least one processor, such as the processor 93, the memory 94 allows the processor 93 to perform some or all of the processes controlled by the processor 93 of FIG. 32 or stores software code 95 including instructions for performing the embodiments described in this specification.

Specifically, instructions and/or operations, which are controlled by the processor 93 of the location server 90 and are stored in the memory 94, according to an embodiment of the present disclosure will now be described.

While the operations are described in the context of control operations of the processor 93 from the perspective of the processor 93, software code for performing these operations may be stored in the memory 94. The processor 93 may control the transceiver 91 to receive information including a notification of using an SS/PBCH block and/or a CSI-RS as a PRS resource or for the purpose of determining a Tx/Rx beam to transmit/receive a PRS resource from the second wireless device 200.

The processor 93 may control the transceiver 91 to transmit PRS resource configuration information to the first wireless device 100 and/or the second wireless device 200 of FIGS. 23A and 23B. A specific method of configuring a PRS resource may be based on the afore-described embodiments. The processor 93 may control the transceiver 91 to receive a report related to at least one of a PRS, an SS/PBCH block, or a CSI-RS from the first wireless device 100 or the second wireless device 200. Specific information included in the report and a specific method of transmitting the report by the first wireless device 100 or the second wireless device 200 may be based on the afore-described embodiments.

Figure 34:
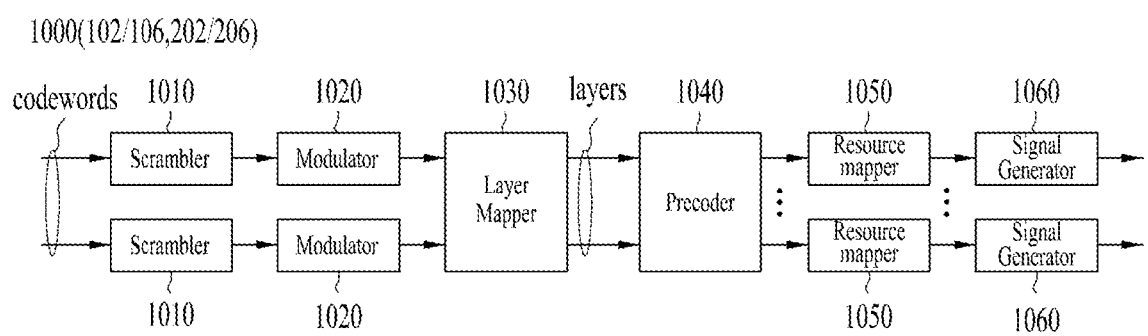
FIG. 34 is a diagram illustrating an exemplary signal processing circuit to which embodiments of the present disclosure are applied.

FIG. 34 illustrates a signal process circuit for a transmission signal.

Referring to FIG. 34, a signal processing circuit 1000 may include scramblers 1010, modulators 1020, a layer mapper 1030, a precoder 1040, resource mappers 1050, and signal generators 1060. An operation/function of FIG. 29 may be performed, without being limited to, the processors 102 and 202 and/or the transceivers 106 and 206 of FIG. 29. Hardware elements of FIG. 34 may be implemented by the processors 102 and 202 and/or the transceivers 106 and 206 of FIG. 29. For example, blocks 1010 to 1060 may be implemented by the processors 102 and 202 of FIG. 29. Alternatively, the blocks 1010 to 1050 may be implemented by the processors 102 and 202 of FIG. 29 and the block 1060 may be implemented by the transceivers 106 and 206 of FIG. 29.

Codewords may be converted into radio signals via the signal processing circuit 1000 of FIG. 34. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 34. For example, the wireless devices (e.g., 100 and 200 of FIG. 30) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

While the above-described method of acquiring positioning information and the apparatus therefor have been described in the context of a 5G NewRAT system, the method and apparatus are also applicable to various other wireless communication systems.

What is claimed is:

1. A method performed by a user equipment (UE) in a wireless communication system, the method comprising:

receiving configuration information comprising: (i) information regarding an identifier (ID) of a positioning reference signal (PRS) resource set, (ii) information regarding each ID of a plurality of PRS resources, (iii) information regarding a repetition number related to the plurality of PRS resources, and (iv) information regarding a PRS timing difference; and receiving a PRS based on the configuration information, wherein the plurality of PRS resources are included in one PRS resource set, wherein all of the plurality of PRS resources are repeated for a time duration of the one PRS resource set by the same repetition number identified according to the information regarding the repetition number, and wherein the PRS timing difference denotes a difference between (i) a timing related to a first PRS received from a first transmission point and (ii) a timing related to a second PRS received from a second transmission point.

2. The method of claim 1, further comprising receiving information related to quasi-colocation (QCL) between at least one of the plurality of PRS resources and a reference signal, wherein the PRS is received further based on the information related to QCL and the reference signal.

3. The method of claim 2, wherein the reference signal comprises at least one of another PRS or a synchronization/physical broadcast channel block (SS/PBCH), and wherein the QCL is QCL type D.

4. The method of claim 2, further comprising:

obtaining information related to an ID of a specific cell; and receiving the reference signal based on the ID of the specific cell.

5. The method of claim 1, wherein a maximum number of PRS resources configurable for the UE is determined based on a capability of the UE.

6. The method of claim 1, further comprising obtaining information related to an angle of a transmission beam for the PRS.

7. The method of claim 1, wherein a resource element (RE) offset per at least one symbol the PRS resource mapped is configured in a frequency domain.

8. The method of claim 7, further comprising obtaining information related to the at least one symbol.

9. The method of claim 1, wherein the plurality of PRS resources are respectively related to a plurality of transmission beams different from each other.

10. The method of claim 1, wherein the first transmission point is a reference transmission point.

11. An apparatus configured to operate in a wireless communication system, the apparatus comprising:

a transceiver; and at least one processor coupled with the transceiver, wherein the at least one processor is configured to:

receive configuration information comprising: (i) information regarding an identifier (ID) of a positioning reference signal (PRS) resource set, (ii) information regarding each ID of a plurality of PRS resources, (iii) information regarding a repetition number related to the plurality of PRS resources, and (iv) information regarding a PRS timing difference; and receive a PRS based on the configuration information, wherein the plurality of PRS resources are included in one PRS resource set, wherein all of the plurality of PRS resources are repeated for a time duration of the one PRS resource set by the same repetition number identified according to the information regarding the repetition number, and wherein the PRS timing difference denotes a difference between (i) a timing related to a first PRS received from a first transmission point and (ii) a timing related to a second PRS received from a second transmission point.

12. The apparatus of claim 11, wherein the at least one processor is further configured to receive information related to quasi-colocation (QCL) between at least one of the plurality of PRS resources and a reference signal, wherein the PRS is received further based on the information related to QCL and the reference signal.

13. The apparatus of claim 12, wherein the reference signal comprises at least one of another PRS or a synchronization/physical broadcast channel block (SS/PBCH), and wherein the QCL is QCL type D.

14. The apparatus of claim 11, wherein the apparatus is configured to communicate with at least one of: a mobile terminal, a network, or an autonomous driving vehicle other than a vehicle comprising the apparatus.

15. An apparatus configured to operate in a wireless communication system, the apparatus comprising:

at least one processor; and at least one memory storing at least one instruction causing the at least one processor to perform a method, wherein the method comprises:

receive configuration information comprising: (i) information regarding an identifier (ID) of a positioning reference signal (PRS) resource set, (ii) information regarding each ID of a plurality of PRS resources, (iii) information regarding a repetition number related to the plurality of PRS resources, and (iv) information regarding a PRS timing difference; and receive a PRS based on the configuration information, wherein the plurality of PRS resources are included in one PRS resource set, wherein all of the plurality of PRS resources are repeated for a time duration of the one PRS resource set by the same repetition number identified according to the information regarding the repetition number, and wherein the PRS timing difference denotes a difference between (i) a timing related to a first PRS received from a first transmission point and (ii) a timing related to a second PRS received from a second transmission point.

16. A method performed by a base station in a wireless communication system, the method comprising:

transmitting configuration information comprising: (i) information regarding an identifier (ID) of a positioning reference signal (PRS) resource set, (ii) information regarding each ID of a plurality of PRS resources, (iii)

information regarding a repetition number related to the plurality of PRS resources, and (iv) information regarding a PRS timing difference; and transmitting a PRS based on the configuration information, wherein the plurality of PRS resources are included in one PRS resource set, wherein all of the plurality of PRS resources are repeated for a time duration of the one PRS resource set by the same repetition number identified according to the information regarding the repetition number, and wherein the PRS timing difference denotes a difference between (i) a timing related to a first PRS transmitted by a first transmission point and (ii) a timing related to a second PRS transmitted by a second transmission point.

* * * * *